(12) United States Patent
Nesteroff et al.

(10) Patent No.: US 12,207,099 B2
(45) Date of Patent: Jan. 21, 2025

(54) NETWORK MONITORING AND TROUBLESHOOTING USING AUGMENTED REALITY

(71) Applicant: Juniper Networks, Inc., Sunnyvale, CA (US)

(72) Inventors: Lyubov Nesteroff, Pleasant Hill, CA (US); Yelena Kozlova, Sunnyvale, CA (US); Fatima Rafiqui, San Jose, CA (US); Arda Akman, San Ramon, CA (US); Burcu Sahin, Ankara (TR)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 383 days.

(21) Appl. No.: 17/653,840

(22) Filed: Mar. 7, 2022

(65) Prior Publication Data
US 2023/0284036 A1 Sep. 7, 2023

(51) Int. Cl.
*H04W 16/20* (2009.01)
*G06T 19/00* (2011.01)
*H04B 17/391* (2015.01)
*H04W 24/10* (2009.01)

(52) U.S. Cl.
CPC ......... *H04W 16/20* (2013.01); *G06T 19/006* (2013.01); *H04B 17/391* (2015.01); *H04W 24/10* (2013.01)

(58) Field of Classification Search
CPC ..... G06T 19/006; H04B 17/391; H04W 24/10
See application file for complete search history.

(56) References Cited

U.S. PATENT DOCUMENTS

| | | |
|---|---|---|
| D405,439 S | 2/1999 | Mullin |
| D661,314 S | 6/2012 | Marchetti |
| D664,153 S | 7/2012 | Van Slembrouck |
| D715,813 S | 10/2014 | Wood |
| D738,390 S | 9/2015 | Bobrovnichiy et al. |
| 9,525,964 B2 | 12/2016 | Piippo et al. |
| D803,249 S | 11/2017 | Masuda |
| 10,488,215 B1 | 11/2019 | Yu |

(Continued)

FOREIGN PATENT DOCUMENTS

CN 112866912 A 5/2021

OTHER PUBLICATIONS

"Technical Specification Group Services and System Aspects; System architecture for the 5G System (5GS)," 3GPP TS 23.501 V17.0.0 (Mar. 2021), 489 pp.

(Continued)

*Primary Examiner* — Fahmida S Chowdhury
(74) *Attorney, Agent, or Firm* — Shumaker & Sieffert, P.A.

(57) ABSTRACT

An example device includes one or more processors; an image capture device coupled to the one or more processors and configured to generate image capture data representative of a three-dimensional (3D) physical environment; an electronic display coupled to the one or more processors; and a memory coupled to the one or more processors, the memory storing instructions to cause the one or more processors to: obtain characteristics of a network associated with the device, generate overlay image data indicative of the one or more characteristics of the network, augment the image capture data with the overlay image data to create augmented image capture data, and output, to the electronic display, the augmented image capture data.

20 Claims, 15 Drawing Sheets

(56) References Cited

U.S. PATENT DOCUMENTS

| | | | |
|---|---|---|---|
| D883,302 S | 5/2020 | Xue | |
| D890,190 S | 7/2020 | VanDuyn | |
| D895,671 S | 9/2020 | Williams et al. | |
| 10,871,377 B1 | 12/2020 | Yu | |
| D911,373 S | 2/2021 | Zhao | |
| 11,014,498 B2 | 5/2021 | Kim | |
| 11,036,897 B2 | 6/2021 | Tiwari et al. | |
| D933,686 S | 10/2021 | Kim et al. | |
| D956,067 S | 6/2022 | Kim | |
| 11,453,346 B2 | 9/2022 | Kim et al. | |
| D992,564 S | 7/2023 | Reygner | |
| 11,796,333 B1 | 10/2023 | Stan et al. | |
| D1,007,527 S | 12/2023 | Anand | |
| 2012/0059720 A1 | 3/2012 | Musabji et al. | |
| 2013/0201214 A1 | 8/2013 | Piippo | |
| 2013/0218688 A1 | 8/2013 | Roos | |
| 2014/0043182 A1 | 2/2014 | Valentine et al. | |
| 2016/0153800 A1 | 6/2016 | Ko | |
| 2016/0153801 A1 | 6/2016 | Cho | |
| 2018/0253601 A1 | 9/2018 | Koo et al. | |
| 2019/0063935 A1 | 2/2019 | Badalamenti et al. | |
| 2019/0244428 A1* | 8/2019 | Greenberg | G06T 7/001 |
| 2020/0201513 A1* | 6/2020 | Malmed | G06F 3/012 |
| 2020/0228539 A1* | 7/2020 | Bonar | G06F 16/51 |
| 2020/0243193 A1* | 7/2020 | Plahey | G16H 40/63 |
| 2020/0252302 A1 | 8/2020 | Lairsey et al. | |
| 2020/0302510 A1 | 9/2020 | Chachek et al. | |
| 2021/0036934 A1* | 2/2021 | Vijayan | G06F 3/017 |
| 2021/0166027 A1* | 6/2021 | Handa | G06Q 30/0241 |
| 2021/0258754 A1 | 8/2021 | Bolot et al. | |
| 2021/0375048 A1 | 12/2021 | Kang | |
| 2022/0254072 A1* | 8/2022 | Scerra | G06K 7/1413 |
| 2023/0013511 A1* | 1/2023 | Cao | G06F 3/012 |
| 2023/0281053 A1* | 9/2023 | Kundu | H04L 69/321 718/105 |
| 2023/0283691 A1* | 9/2023 | Kundu | H04L 67/63 455/414.1 |
| 2023/0284036 A1 | 9/2023 | Nesteroff et al. | |
| 2024/0098470 A1* | 3/2024 | Kundu | G06T 1/20 |
| 2024/0121598 A1* | 4/2024 | Boccuzzi | H04L 67/133 |

OTHER PUBLICATIONS

Busch, "5G site testing and troubleshooting," Rohde & Schwarz, Nov. 19, 2019, 17 pp., Retrieved from the Internet: URL: https://www.rohde-schwarz.com/us/solutions/test-and-measurement/mobile-network-testing/stories-insights/5g-site-testing-and-troubleshooting_253118.html.

Nelson, "5G Test Special Report," Electronic Design, Nov. 22, 2020, 32 pp. Retrieved from the Internet: URL: https://www.electronicdesign.com/techxchange/special-reports/article/21211069/5g-test-special-report.

Johnson, Leif, "10 augmented reality apps for iPhone and iPad you should be using right now," Apr. 21, 2019, posted at macworld.com, [site visited Jan. 2, 2024]. https://www.macworld.com/article/232676/best-aug mented-reality-ar -apps-for -ios-i phone-i pad. html (Year: 2019), 2 pp.

Office Action from U.S. Appl. No. 29/792,136 dated Jan. 8, 2024, 11 pp.

Russon, Mary-Ann, "Gatwick Airport first in world to use augmented reality navigation . . . " May 25, 2017, posted at ibtimes.co.uk, [site visited Jan. 2, 2024]. https://www.ibtimes.eo.uk/feeling-lost -gatwick-airport -first -world-use-augmented-reality-beacons-guiding-travellers-1623341 (Year: 2017), 1 pp.

Extended Search Report from counterpart European Application No. 22215160.7 dated Jul. 13, 2023, 10 pp.

Langer et al., "Marvis: Combining Mobile Devices and Augmented Reality for Visual Data Analysis", Proceedings of The 2022 ACM Workshop on Secure and Trustworthy Cyber-Physical Systems, New York NY, May 6, 2021, pp. 1-17.

"Algorithmically Lighten or Darken Colors" Jan. 24, 2020, posted at colorspace.r-forge.r-project.org, [site visited Apr. 9, 2024]. https://web.archive.org/web/20200124073859/https://colorspace.r-forge.r-project.org/reference/lighten.html (Year: 2020), 2 pp.

"Pantone Color of the Year" May 14, 2014, posted at allfreediyweddings.com, [site visited Apr. 9, 2024]. https://web.archive.org/web/20140514132557/https://www.allfreediyweddings.com/wedding-color-schemes/pantone-color -of-the-year-radiant-orchid-wedding-color -schemes#google_vignette (Year: 2014), 1 pp.

Notice of Allowance from U.S. Appl. No. 29/792,136 dated Apr. 15, 2024, 9 pp.

Response to Extended Search Report dated Jul. 13, 2023, from counterpart European Application No. 22215160.7 filed Mar. 11, 2024, 24 pp.

Response to Office Action dated Jan. 8, 2024 from U.S. Appl. No. 29/792,136, filed Apr. 8, 2024, 13 pp.

"Wi-Fi AR" Aug. 5, 2020, posted at wifisolutions.com, https://wifisolutions.com.ua/wifiar (Year: 2020).

Notice of Allowance from U.S. Appl. No. 29/923,835 dated Jul. 2, 2024, 10 pp.

Notice of Allowance from U.S. Appl. No. 29/923,842 dated Jul. 3, 2024, 10 pp.

Office Action, and translation thereof, from counterpart Chinese Application No. 202330744254.4 dated May 11, 2024, 2 pp.

Sharma et al., "Augmented Reality Navigation", researchgate.net, Jun. 2020, 6 pp., (Applicant points out, in accordance with MPEP 609.04(a), that the year of publication, 2020, is sufficiently earlier than the effective U.S. filing date, so that the particular month of publication is not an issue.).

Staneva et al., "Augmented Reality Map Navigation Animation", dribbble.com, Mar. 22, 2021, (Applicant points out, in accordance with MPEP 609.04(a), that the year of publication, 2021, is sufficiently earlier than the effective U.S. filing date, so that the particular month of publication is not an issue.).

* cited by examiner

NETWORK MONITORING AND TROUBLESHOOTING USING AUGMENTED REALITY

TECHNICAL FIELD

The disclosure relates to computer networking, and to monitoring and troubleshooting a network using augmented reality.

BACKGROUND

Computer networks have become ubiquitous, and the number of network applications, network-connected devices, and types of network-connected devices are rapidly expanding. Such devices now include computers, smartphones, Internet-of-Things (IoT) devices, vehicles, medical devices factory equipment, etc. 5G mobile network architectures enhanced the ability to provide communication services using cloud-based network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

In general, the disclosure describes techniques for maintaining and troubleshooting a network, for example, a 5G mobile network. Troubleshooting the network can be assisted using augmented reality, for example, augmented reality presented on a screen of a commonly available user device such as a smartphone, tablet computer, test device, or laptop computer. Using the techniques disclosed herein, an end-user of a communications service can create and troubleshoot network components and/or network slices associated with the tenant. In some aspects, the end user can be a tenant (e.g., a customer) of a 5G mobile network operator (MNO). As an example, the tenant may be an enterprise customer of the MNO. In some aspects, the user can be an administrator of a 5G mobile network service provider (NSP) or MNO.

5G mobile networks can be used to create flexible infrastructures that can be adapted as tenant requirements change. For example, in 5G, many network functions and services are virtualized, and may be implemented in cloud based computing environments. Additionally, tenants may administer network functions and services that are provided by a mobile network operator. Mobile network operator personnel are not typically present at a tenant's site, so when issues arise with 5G functions and services leased by a tenant from the mobile network operator, it may be up to the tenant to troubleshoot the issue. Further, the complexity and variety of interfaces and parameters for services in a 5G mobile network can lead to problems in troubleshooting issues with network slices. For example, a tenant may be limited in terms of the skill and tools necessary to troubleshoot an issue with a 5G mobile network or network slice.

According to the techniques disclosed herein, a tenant, network service provider, or other user or administrator of the 5G network, can utilize a client device, such as a smartphone, tablet computer, test device, etc., to obtain characteristics of a network or network device in the field of view of a camera or other image capture device of the client device. As an example, the network characteristics can include signal strength information for wireless network signals that may be transmitted within the field of view of the camera. As another example, the network characteristics can include network characteristic of a network device such as a base station that is within the field of view of the camera. As a further example, the network characteristics can include network characteristics of a network slice implemented, at least in part, by the network device or carried by the wireless network signals.

The network characteristics can be used by the tenant or mobile network operator to make decisions regarding deployment locations of base stations or access points and/or regarding configurations of network devices or network slices.

The techniques of this disclosure provide one or more technical advantages and practical applications. For example, the techniques enable tenants to easily gather information to aid in troubleshooting network issues related to network devices at a tenant site. The tenant either use the information to make decisions regarding network hardware and network configuration (e.g., network slice configuration), or the information can be relayed to a mobile network operator to aid the mobile network operator with troubleshooting network issues. As an example, IT personnel of a tenant can use a client device configured to implement the techniques described herein to determine a radio unit is sending or receiving traffic, obtain data for a network slice carried by the radio unit, obtain historical data from a Radio Access Network Intelligent Controller that may indicate when a problem started, and/or obtain other data useful for troubleshooting network issues.

In one example, this disclosure describes a device that includes one or more processors; an image capture device coupled to the one or more processors and configured to generate image capture data representative of a three-dimensional (3D) physical environment; an electronic display coupled to the one or more processors; and a memory coupled to the one or more processors, the memory storing instructions to cause the one or more processors to: obtain characteristics of a network associated with the device, generate overlay image data indicative of the one or more characteristics of the network, augment the image capture data with the overlay image data to create augmented image capture data, and output, to the electronic display, the augmented image capture data.

In another example, this disclosure describes a method that includes obtaining, by one or more processors of a client device, characteristics of a network associated with the client device; obtaining, by the one or more processors, image capture data representative of a 3D physical environment from an image capture device; generating, by the one or more processors, overlay image data indicative of the one or more characteristics of the network; augmenting, by the one or more processors, the image capture data with the overlay image data to create augmented image capture data; and outputting, by the one or more processors, the augmented image capture data to an electronic display device.

In another example, this disclosure describes a computer-readable medium having stored thereon instructions, that when executed, cause one or more processors to: obtain characteristics of a network associated with the client device; obtain image capture data representative of a 3D physical environment from an image capture device; generate overlay image data indicative of the one or more characteristics of the network; augment the image capture data with the overlay image data to create augmented image capture data; and output the augmented image capture data to an electronic display device.

The details of one or more examples are set forth in the accompanying drawings and the description below. Other features, objects, and advantages will be apparent from the description and drawings, and from the claims.

DETAILED DESCRIPTION

Figure 1A:
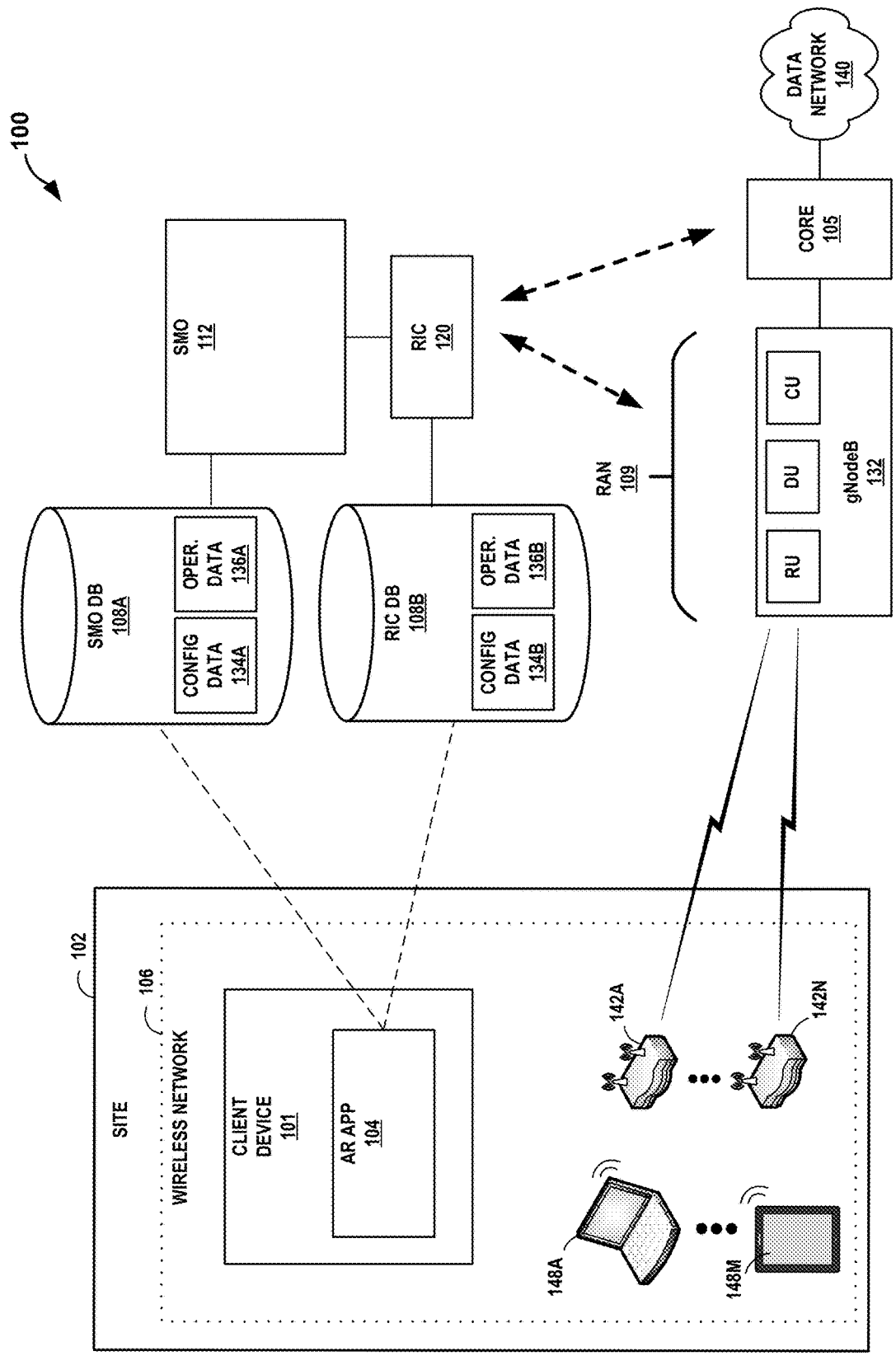
FIG. 1A is a block diagram illustrating an example network monitoring and troubleshooting system, in accordance with one or more techniques of the disclosure.

FIG. 1A is a block diagram illustrating an example network monitoring and troubleshooting system, in accordance with one or more techniques of the disclosure. In the example illustrated in FIG. 1A, network system 100 includes site 102, Service and Management Orchestrator (SMO) 112, RAN Intelligent Controller (RIC) 120, one or more radio access networks (RANs) 109, and core 105. Site 102 includes wireless networks 106. Although in FIG. 1A, site 102 is shown as including a single wireless network 106, in some examples, site 102 may include multiple wireless networks, and the disclosure is not limited in this respect. Site 102 may be one of many sites operated by an enterprise.

Site 102 can include a plurality of wired client-side devices, such as base stations 142 and IoT devices, within a wired network edge. For example, site 102 includes a plurality of base stations 142A through 142N. Each base station 142 may be any type of wireless access point, including, but not limited to, a commercial or enterprise AP, a router, or any other device that is capable of providing wireless network access to client devices within the site. Base stations 142 may also have a wireless connection to RAN 109. Base stations 142 may be radio units (RUS) of RAN 109. Although illustrated in FIG. 1A as if all base stations 142 of site 102 are connected to or part of a single RAN 109, in other examples, base stations 142 may be connected to different RANs. In some aspects, RAN 109 may be an Open Radio Access Network (O-RAN), a 5G mobile network RAN, a 4G LTE mobile network RAN, another type of RAN, or a combination of the above. O-RAN is an approach to networking in which disaggregated functions can be used to deploy mobile fronthaul and midhaul networks. The disaggregated functions can be cloud-based functions.

Each site 102 can also include a plurality of equipment devices (UEs, also referred to as client devices) 148, representing various wireless-enabled devices within each site. For example, a plurality of UEs 148A through 148M are shown to be currently located at site 102. Each UE 148 may be any type of wireless client device, including, but not limited to, a mobile device such as a smartphone, test device, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In some examples, RANs such as RAN 109 include radio units (RUs) located at various cellular network sites ("cell sites"), along with distributed units (DUs) and centralized units (CUs). Each RU consists of an LO PHY and a RF transmitter. The LO PHY component may be implemented using specialized hardware for high-performance packet processing. Such cell sites may be distributed at different locations within site 102 to provide cellular radio coverage for users operating user equipment within site 102. As noted above, RUs of RAN 109 may be represented in FIG. 1 as base stations 142.

RUs can connect to DUs via a fronthaul network. The fronthaul network connects LO PHY and HI PHY and is used by RUs and DUs to implement the F2 interface of 5G. DUs manage the packet transmission of radio by the RUs. In some cases, such packet transmission conforms to the Common Packet Radio Interface (CPRI) and/or to the enhanced CPRI (eCPRI) standard, or to IEEE 1914.3. DUs may implement the Radio Link Control (RLC), Media Access Control (MAC), and the HI PHY layer. DUs are at least partially controlled by CUs.

DUs can connect to CUs via a midhaul network, which may be used by DUs and CUs to implement the F1 interface of 5G. CUs may implement the Radio Resource Control (RRC) and Packet Data Convergence Protocol (PDCP) layers. CUs connect to core 105 via a backhaul network. The midhaul and backhaul networks may each be wide area networks (WANs).

RAN 109 may include gNodeB 132. In some examples of RAN 109 of network system 100, gNodeB 132 includes an RU, a CU and a DU. A CU may support multiple DUs to implement multiple gNodeBs. Further, one or more RUs may be supported by a single DU. Although illustrated as separate from site 102, RU(s) of gNodeB 132 may be base stations 142 located within site 102.

Any DU may or may not be located at the cell site that includes the RU(s) supported by the DU. A DU may be located at a cell site, while other DUs may be located at a local data center and collectively support multiple RUs. Network system 100 may have radio access networks 109 that include many thousands of cell sites and gNodeBs.

Radio access networks 109 connect to core 105 to exchange packets with data network 140. Core 105 may be a 5G core network, and data network (DN) 140 may represent, for example, one or more service provider networks and services, the Internet, 3rd party services, one or more IP-VPNs, an IP-multimedia subsystem, a combination thereof, or other network or combination of networks. In some aspects, resources associated with the service provided by a mobile network operator to the tenant may be provided by, or managed by, functions of core 105 and/or components of RAN 109. In some aspects, core 105 implements various discrete control plane and user plane functions for network system 100. Examples of 5G control plane functions that may be provided by core 105 include Access Mobility Management Function (AMF), Session Management Function (SMF), Policy Control Function (PCF), User Data Management (UDM), Network Repository Function (NRF), Authentication Server Function (AUSF), and Network Slice Selection Function (NSSF). AMF may provide access mobility management services. SMF may provide session management services. PCF may provide policy control services. Unified Data Management (UDM) function may manage network user data. AUSF may provide authentication services. Network Repository Function (NRF) may provide a repository that can be used to register and discover services in a network operator's network. Network Slice Selection Function (NSSF) may be used to select an instance of an available network slice for use by a user equipment (UE) device 148. Core 105 may also include User Plane Functions (UPF). A UPF may provide packet routing, forwarding and other network data processing functions (e.g., Quality of Service, packet inspection, traffic optimization etc.). Further details on services and functions provided by AMF, SMF, PCF, UDM, NRF, AUSF, NRF, UPF, and NSSF can be found in 3rd Generation Partnership Project 2021, *Technical Specification Group Services and System Aspects; System architecture for the 5G System (5GS); Stage* 2 (*Release* 17), TS 23.501 V17.0.0 (2021-03), the entire contents of which is hereby incorporated by reference.

Aspects of RAN 109 and/or core 105 may be managed and/or monitored by SMO 112 and RIC 120. In some aspects, SMO 112 and RIC 120 may be operated by the mobile network operator providing 5G services to a tenant, e.g., a tenant operating site 102. SMO 112 can orchestrate and control management and automation aspects of RAN 109. Further, SMO 112 may control aspects of RIC 120. In some aspects, RIC 120 may include a non-real time RIC and a near-real time RIC. The non-real time RIC can provide non-real-time control and optimization of RAN elements and resources such as RUs, DUs, and CUs, workflow management, and policy-based control of applications and features of the near-RT RIC. The near-real time RIC can provide near-real-time control and optimization of RAN elements and resources via fine-grained data collection and actions over an E2 interface. The near-real-time RIC can include enforcement of policies received from the non-real-time RIC.

SMO 112 can generate and maintain SMO database 108A that can include configuration data 134A and operational data 136A. Configuration data 134A can include data about the configuration of RAN 109, services and functions provided by core 105, and other configuration data maintained by SMO 112. Operational data 136A can include data collected during the operation of network devices at site 102 along with data collected from elements of RAN 109 and the services and functions provided by core 105.

RIC 120 can generate and maintain database 108B that can include configuration data 134B and operational data 136B. Configuration data 134B can include data about the configuration of RIC 120. Operational data 136B can include data collected during the operation of network devices at site 102 along with data collected from elements of RAN 109, RIC 120 and the services and functions provided by core 105.

Although shown as single units, database 108A and/or database 108B may be distributed across multiple units (e.g., multiple database servers). Further, database 108A and database 108B may be combined in a single database.

Client device 101, like UEs 148, can be a smartphone, tablet computer, test device, or laptop computer, or the like. In some aspects, client device 101 may be operated by mobile network operator personnel and used to maintain and troubleshoot network devices for tenants or for the use of the mobile network operator, for example. Client device 101 can include an augmented reality (AR) application 104. AR application 104 can be configured to obtain, from image data captured by a camera or other image capture device of client device 101, identifying information for a network device such as base stations 142 or other network device of site 102. AR application 104 can use the identifying information to obtain, from configuration data 134A, operational data 136A, configuration data 134B and/or operational data 136B, data regarding the network device. AR application 104 may query SMO 112 or RIC 120 to obtain the configuration data and/or operational data.

AR application 104 can format and present selected portions of the configuration data and/or operational data regarding the identified network device on a display client device 101. Using the configuration data and/or operational data, AR application 104 may generate overlay image data representative of one or more characteristics of the network that includes the identified network deice. The network may be the mobile network, and such characteristics may include characteristics of the network, the network device, a network slice, signal strength, slice identifiers or slice characterization data for a 5G network slice, or other characteristics. AR application 104 may augment image data captured by client device 101 with the overlay image data to create augmented image capture data. Client device 101 may then output the augmented image capture data to an electronic display of client device 101.

Figure 1B:
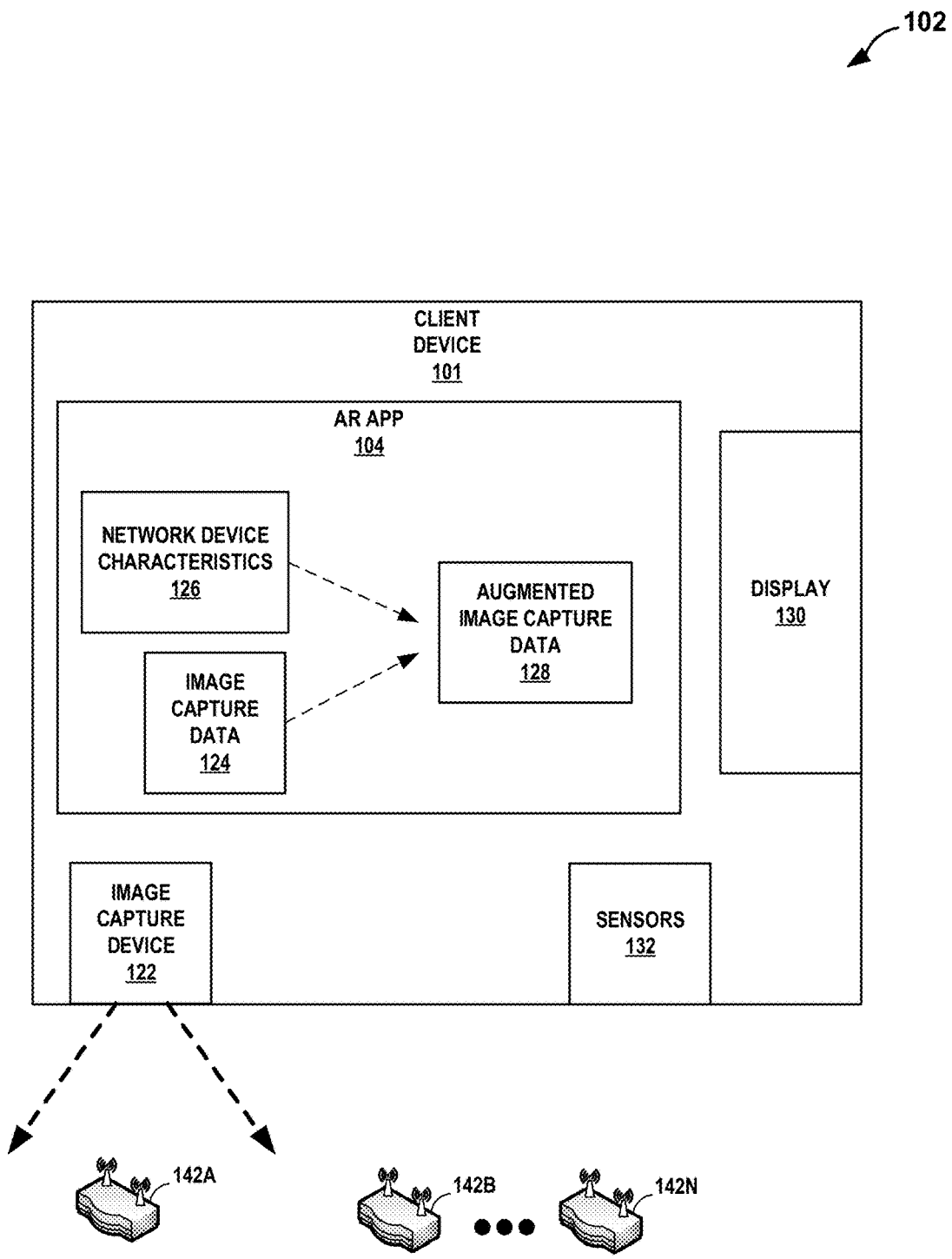
FIG. 1B is a block diagram illustrating further example details of a client device of the network system of FIG. 1A.

FIG. 1B is a block diagram illustrating further example details of a client device of the network system of FIG. 1A. In some aspects, client device 101 includes one or more image capture devices 122, e.g., cameras, infrared (IR) detectors, Doppler radar, line scanners and the like, for capturing image data of the surrounding physical environment (e.g., the physical environment of site 102). Client device 101 also includes an electronic display 130. Electronic display 130 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. Client device 101 can also include one or more sensors 132. Examples of sensors include Global Positioning System (GPS) receivers, accelerometers, gyroscopes, magnetometers, etc.

AR application 104 is configured to receive image capture data 124 from image capture device 122. The image capture data represents a 3D physical environment in the field of view of image capture device 122. AR application 104 can analyze the image capture data using image recognition techniques to determine a device identifier for a network device within the image capture data. As an example, a network device such as base station 142A may have a bar code, QR code, or other tag identifying the network device.

AR application 104 can use the device identifier to retrieve from configuration data 134 and/or operational data 136, information which AR application 104 can use to determine various network device characteristics 126 of the identified network device. Such characteristics can include signal strength, a "heat map" indicating signal strength in different areas of site 102, network performance characteristics, configuration information, tracking areas associated with the network device, installation information, RAN interfaces and functions used by the network device etc.

AR application 104 can use the network device characteristics to generate augmented image capture data 128. In some aspects, AR application 104 can generate a graphical representation of the network device characteristics. This graphical representation can be overlayed with image capture data 124 to generate augmented image capture data 128. In some aspects, AR application 104 can overlay text describing the network device characteristics with image capture data 124 to generate augmented image capture data 128. In further aspects, AR application 104 can replace image capture data 124 with text and/or graphical representations of the network device characteristics to generate augmented image capture data 128. AR application 104 can present augmented image capture data 128 on electronic display 130. In some aspects, AR application 104 can present augmented image capture data 128 as a stream of video data. AR application 104 can present the augmented image capture data on electronic display 130 until some terminating event, such as a button press, menu selection, detecting that the network device no longer appears in the image capture data, etc. In some aspects, AR application 104 can present the augmented image capture data 128 on electronic display 130 as a still image.

The techniques for monitoring and troubleshooting a network using augmented reality described herein can be applied at various points in the lifecycle of a network device, network and/or network slice, from installation and configuration of network devices through various stages in the operation of the network. FIGS. 2-7 illustrate various examples of user interface screens presented on electronic display 130 that have different types of augmented image capture data 128 related to network devices and/or networks. The discussion of FIGS. 2-7 will be presented in the context of troubleshooting a poor wireless connection environment at a site using a client device 200. In the examples illustrated in FIGS. 2-6, client device 200 can be a smartphone implementation of client device 102 of FIG. 1. In some aspects, AR application 104 (or a user of AR application 104) may be authenticated to the network for which trouble shooting activities and/or installation activities are to take place prior to such activities.

Figure 2:
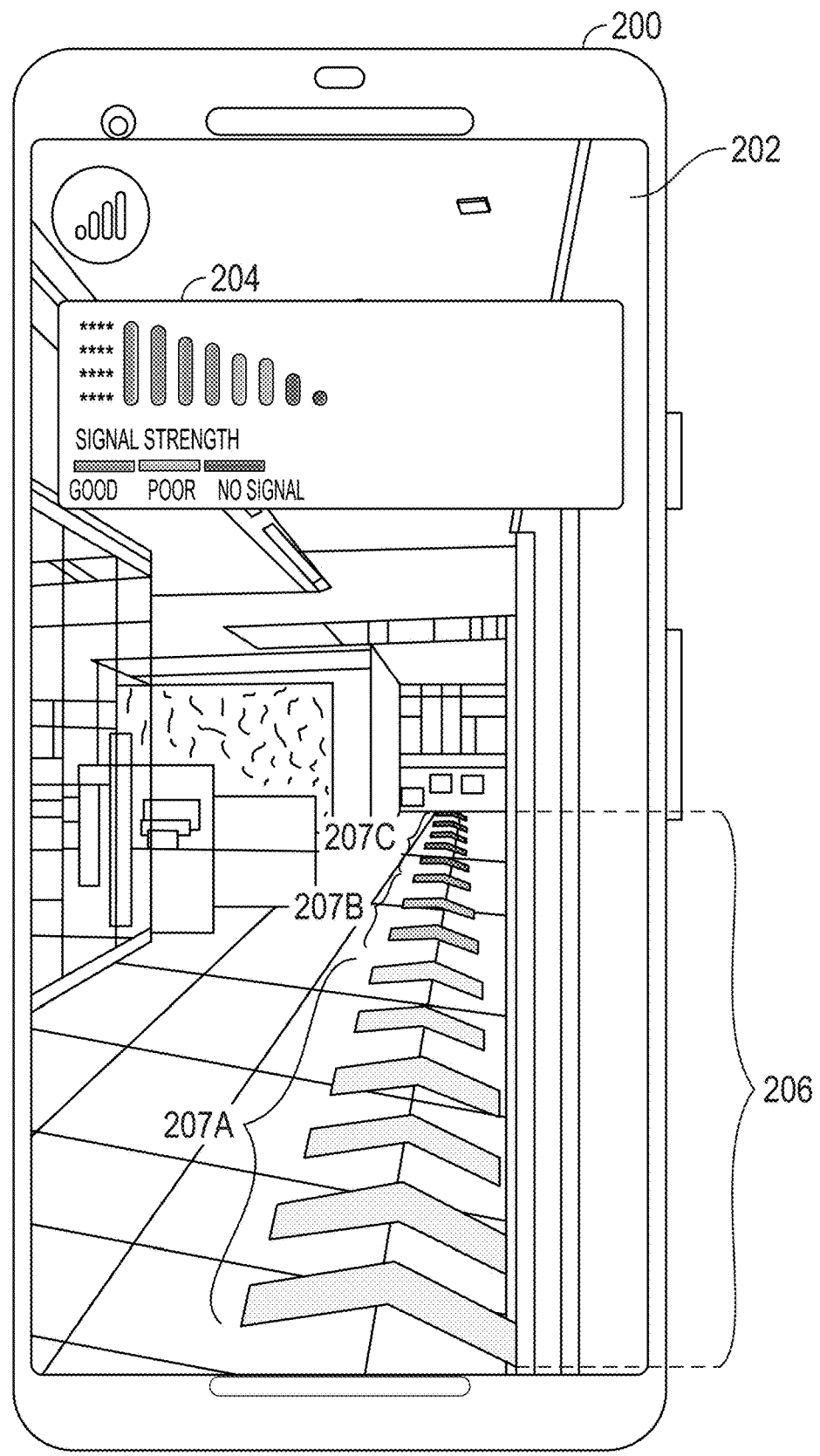
FIG. 2 is a conceptual view of a user interface screen showing augmenting image capture data with signal strength information, in accordance with one or more techniques of the disclosure.

FIG. 2 is a conceptual view of a user interface screen showing augmenting image capture data with signal strength information, in accordance with one or more techniques of the disclosure. Client device 200 may represent an example instance of client device 101 of FIGS. 1A-1B. In the example illustrated in FIG. 2, AR application 104 (FIGS. 1A and 1B) executing on client device 200 can generate a user interface (UI) 202 that can be a frame of a video stream captured by an image capture device 122 of client device 200 and presented on electronic display 130 of client device 200. In this example, AR application 104 can generate image data for a line of glyphs 206 indicating signal strength along a line within the field of view of image capture device 122. AR application 104 can merge the image data for line of glyphs 206 with image capture data 124 for the frames of the video stream such that line of glyphs 206 to create augmented image capture data 128 where the line of glyphs 206 appear on top of or otherwise augment image capture data 124. For example, AR application 104 can generate image data for line of glyphs 206 such that each glyph in the line of glyphs corresponds to a signal strength at a location in the physical 3D environment captured by image capture device 122. AR application 104 positions the image data for line of glyphs 206 within augmented image capture data 124 such that each glyph in the line of glyphs corresponds to a signal strength measured or predicted in the 3D environment at a position in the image capture data 124 that corresponds to the location at which the signal strength was measured or predicted. In some aspects, AR application 104 can augment image capture data 122 with a signal strength legend 204 indicating a color coding of the glyphs 206, where a color represents a particular signal strength quality. In the example illustrated in FIG. 2, legend 204 includes three levels of signal quality: "good," "poor," and "no signal."

In this way, client device 200 can indicate signal strength not merely in the immediate vicinity of client device 200 but can provide visual indications of signal strength in the surrounding area of client device 200, where the surrounding area may be the physical environment within the visual proximity of the user, within a pre-defined or user-configurable distance, or other surrounding area. As seen on UI 202, relative signal strengths are indicated using collinear glyphs 206 along a vector that is substantially in a horizontal plane for the physical environment. In this way, line of glyphs 206 may indicate signal strengths along vectors in the physical environment that will tend to correspond to movements of a user of client 200. For example, and as seen in UI 202, line of glyphs 206 is shown on the floor of the hallway.

AR application 104 (or another application on client device 200) can obtain signal strength values for the site in various ways. For example, in some aspects, client device 200 may measure and store signal strength values as the client device is moved about the site, along with a location where the signal strength value was measured. In some aspects, applications on multiple client device 200 may measure signal strength values as the client device is moved from one location to another. The client devices can report the signal strength values and their associated locations to SMO 112, which can store the signal strength values and associated locations as part of operational data 136. In some aspects, signal strength information can be obtained from RIC 120. RIC 120 may query signal strength and location information for UEs in the vicinity of a base station or other RU. The UE can report the current signal strength information, its location, and a timestamp to RIC 120, which can correlate the information with information obtained from other UEs. RIC 120 can store the correlated information for later use by applications such as AR application 104. In some aspects, RIC 120 may predict the signal strength information for locations based on signal transmission characteristics of the identified base station.

In some aspects, the signal strength information may indicate the signal strength for a base station or other RU. In some aspects, the signal strength information may include Wi-Fi signal strength information that may be obtained from access points or network management systems for a Wi-Fi network.

In some aspects, the locations may be obtained using a GPS sensor of client device 200. In some aspects, the locations may be determined by obtaining signal strengths from base stations at site 102 along with their respective locations and performing triangulation using the signal strengths. In some aspects, SMO 112 can maintain a "heat map" of signal strength values based on the signal strengths at various locations of site 200. AR application 104 can obtain the heat map and use the heat map to generate the line of glyphs 206. In some aspects, AR application 104 can obtain the signal strength values and associated locations from SMO 112 and generate the heat map for the current location of client device 200. Client device 200 may use sensors 132 to determine the current location of client device 200 and the direction the client device is pointing. For example, client device 200 may use information from a GPS sensor to determine location and information from a compass, accelerometer, or other sensor to determine the direction that the client device 200 is pointing. AR application 104 can use the location and direction information to correlate the positioning and color coding of the line of glyphs with the heat map.

In some aspects, the signal strength may indicate historical signal strength in the area of the field of view of image capture device 122. For example, RIC 120 or SMO 112 may maintain historical signal strength information. AR application 104 can augment image capture data for a site with historical data indicating the typical signal strength according to time of day, day of week, etc. Line of glyphs 206 may thus indicate the typical signal strength according to the historical data, in some examples.

In the example illustrated in FIG. 2, the signal quality is relatively good in region 207A near client device 200, but as the line of glyphs 206 indicate, the signal quality decreases to a poor signal in region 207B, and eventually drops to the point of there being no signal in region 207C. A user of AR application 104 may use the signal strength indicators to determine that a new base station should be located in this area of the site.

The example discussed above has been in the context of signal strength network characteristics. Line of glyphs 206 may represent other network characteristics, including network characteristics associated with a particular network slice. For example, line of glyphs 206 may represent throughput, capacity, or other performance characteristics of a network, network slice, network device etc.

Figure 3A:
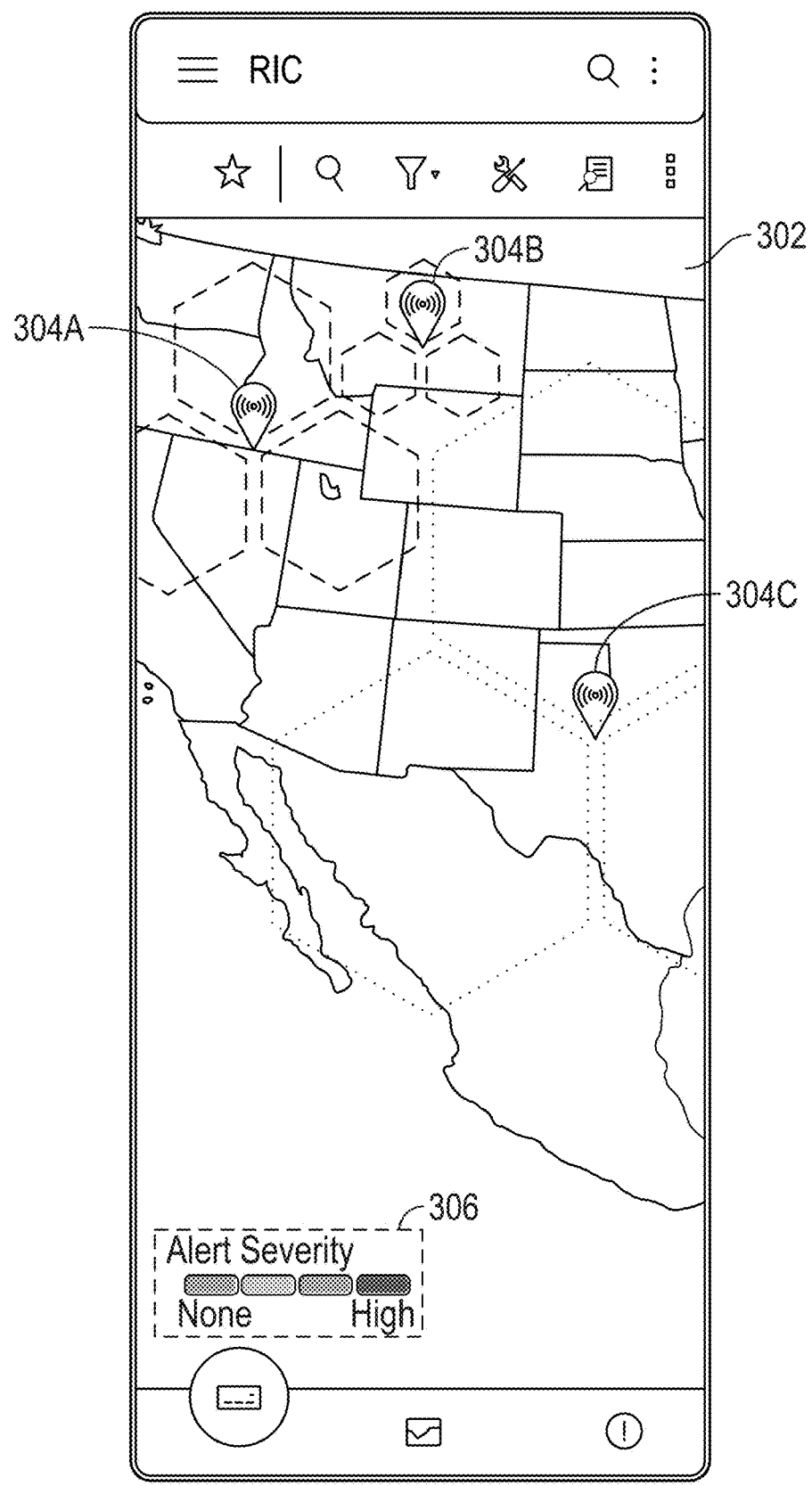
FIG. 3A is a conceptual view of a user interface screen showing example tracking areas to which a new base station may be assigned.
Figure 3B:
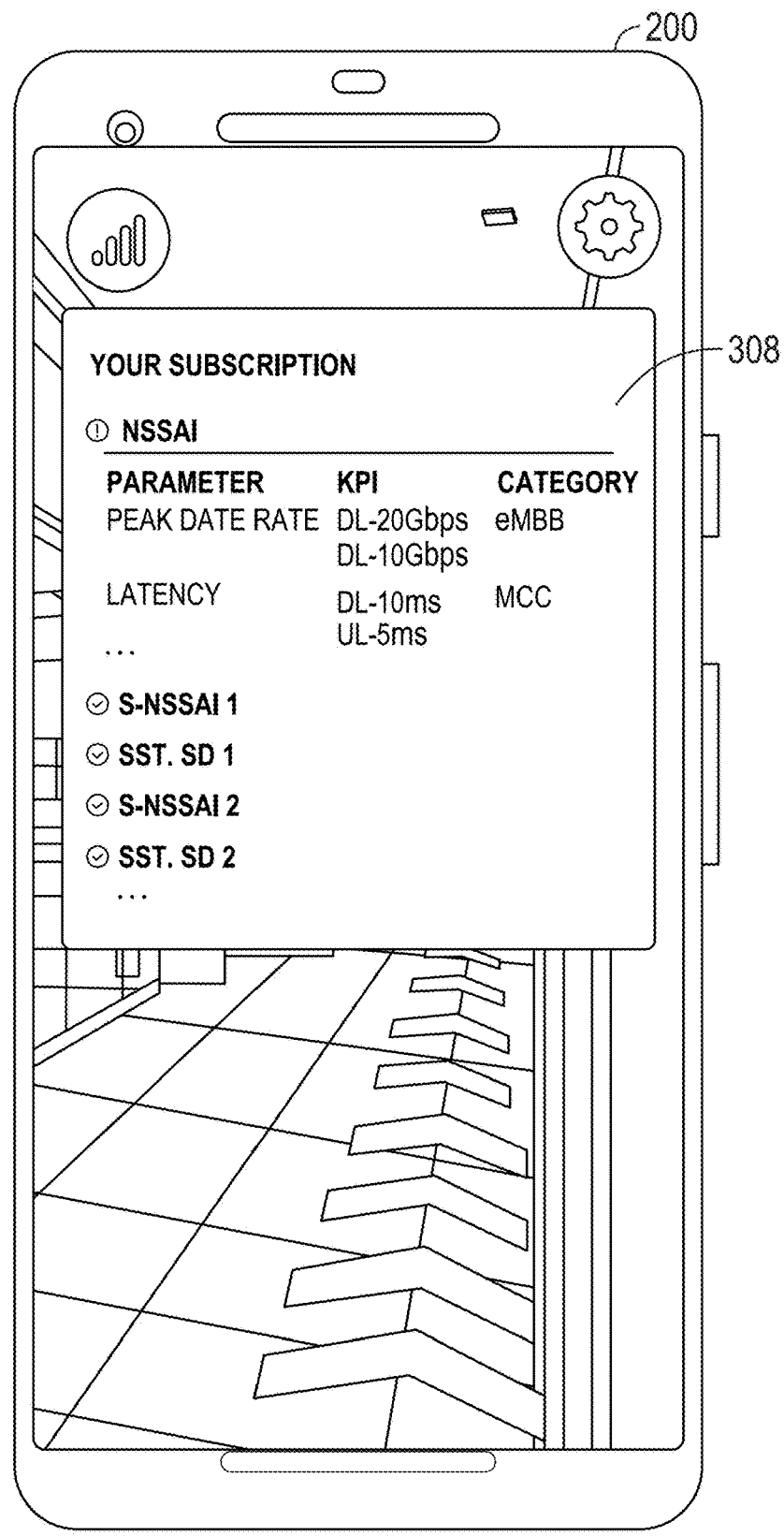
FIG. 3B is a conceptual view of an example user interface screen showing slice subscription information, in accordance with one or more techniques of the disclosure.

FIGS. 3A and 3B are conceptual views of user interface screens for that can include information useful for installing a new base station. In the example shown in FIGS. 3A and 3B, a tenant has decided, based on the signal quality shown in FIG. 2, that a new base station 414 is to be installed improve the signal quality at the site.

FIG. 3A is a conceptual view of a user interface screen showing example tracking areas to which a new base station may be assigned. Generally speaking, a tracking area is a set of one or more mobile network cells within a region that are grouped together to facilitate reducing overhead involved with managing UEs. For example, handshaking protocols can be avoided when a UE moves from one cell in a tracking area to another cell in the same tracking area. A network slice can be associated with multiple tracking areas. Tracking area screen 302 can identify tracking areas that are to be associated with a new base station. In the example illustrated in FIG. 3A, tracking area screen 302 shows a map illustrating tracking areas 304 within a geographic region. A user can utilize tracking area screen 302 to determine one or more of tracking areas 304 with which to associate a new base station. Tracking area screen 302 can include a legend 306 that explains aspects of the tracking areas 304 shown on tracking area screen 302. As an example, legend 306 shows a color-coded bar that can indicate an alert condition and severity associated with a tracking area 304.

FIG. 3B is a conceptual view of an example user interface screen showing slice subscription information. In some aspects, example user interface screen 308 can include information about one or more network slices for the current network associated with client device 200. In the example shown in FIG. 3B, example interface screen 308 includes Network Slice Selection Assistance Information (NSSAI) for network slices such as performance indicators and categories for different performance parameters for slices. In the example illustrated in FIG. 3B, the performance parameters include peak upload and download data rates, upload and download latency. Categories for the slices include enhanced Mobile Broadband (eMBB) and mobile cloud computing (MCC) slices.

Additionally, user interface screen 308 can include information for Single NSSAI (S-NSSAI), Slice Service Types (SSTs), and Slice Differentiators (SDs). In the example shown in FIG. 3B, user interface screen 308 includes drop down selectors for two S-NSSAIs: "S-NSSAI 1" and "S-NSSAI 2." Additionally, example user interface screen SDs: "SST.SD 1" and "SST.SD 2."

Figure 4:
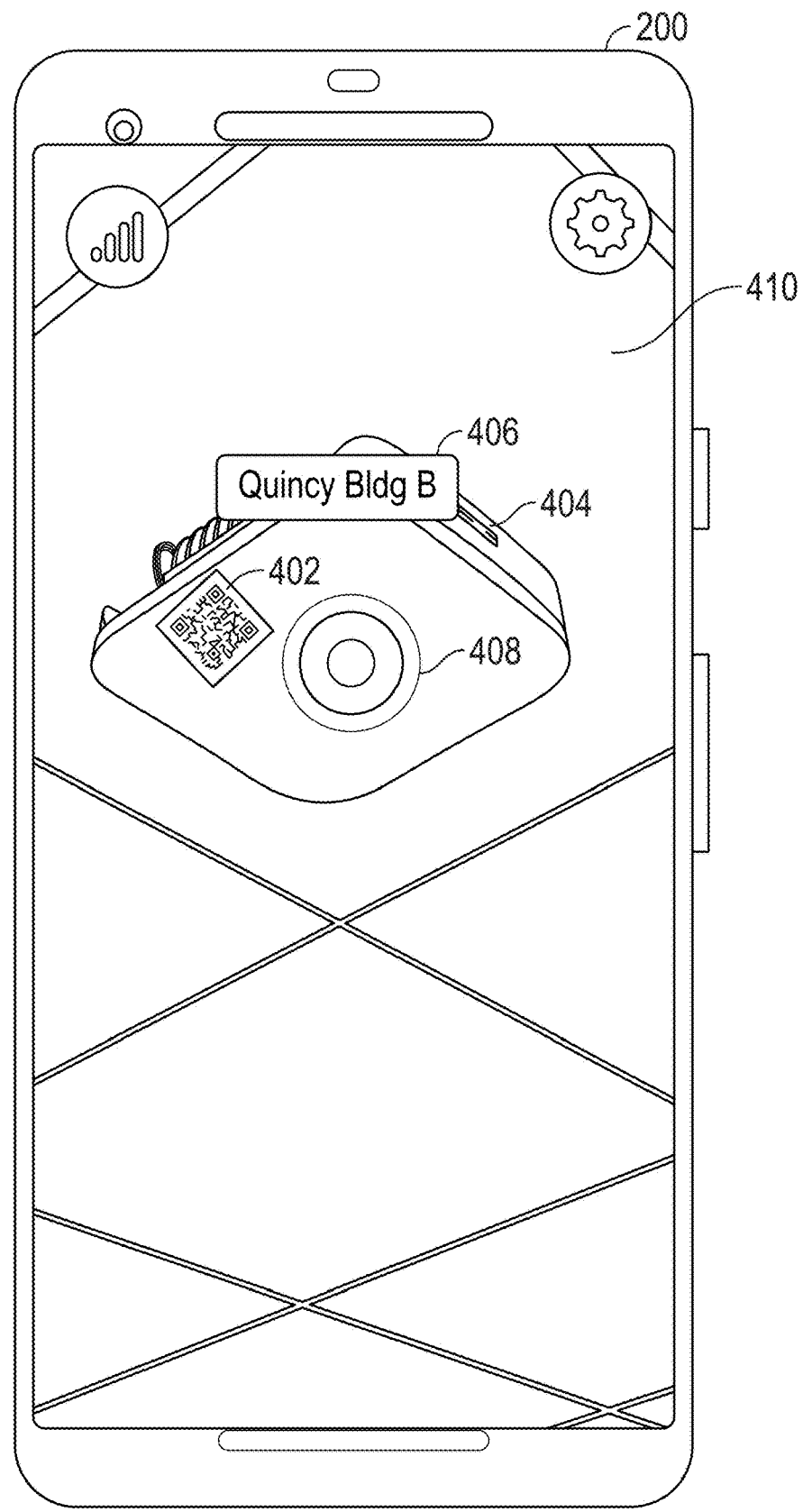
FIG. 4 is a conceptual view of a user interface screen showing image capture data that includes a base station, in accordance with one or more techniques of the disclosure.

FIG. 4 is a conceptual view of a user interface screen showing image capture data that includes a base station, in accordance with one or more techniques of the disclosure. In the example shown in FIG. 4, a tenant of a mobile network operator has decided, based on the signal quality shown in FIG. 2 and, perhaps, information shown in example screens 302 and 308 of FIGS. 3A and 3B, that a new base station 404 is to be installed at the site to improve the signal quality at the site. Base station 404 may have indicia 402 that encodes an identifier for the new base station. In the example shown in FIG. 4, indicia 402 is a "quick response" (QR) code. In other examples, indicia 402 may be a bar code, text, or other type of indicia. A user may point client device 200 at base station 404 to place base station 404 in the field of view of image capture device 122. Client device can present user interface 400 on the electronic display 130 of client device 200. AR application 104 can scan image capture data 124 captured by image capture device 122 and decode indicia 402 to determine the identifier associate with base station 404. In some aspects, AR application 104 can generate augmented image capture data 128 that includes a location identifier 406 (e.g., "Quincy Building B") of base station 404. In some aspects, AR application 104 can generate virtual button 408 for display within user interface 400. In response to selection of virtual button 408, AR application 104 can augment information displayed on electronic display 130 of client device 200 as further described below.

Figure 5A:
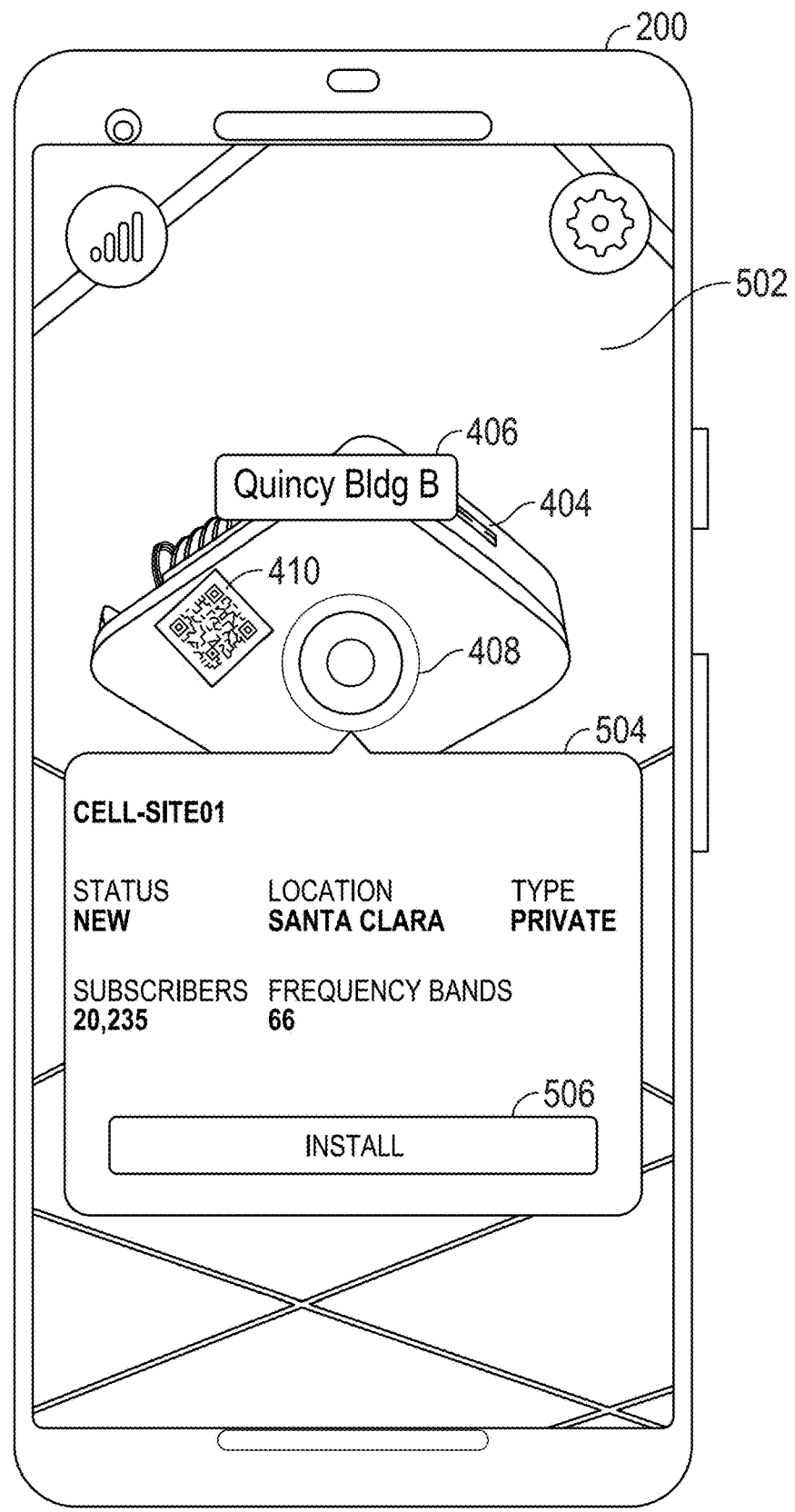
FIGS. 5A and 5B are conceptual views of user interface screens showing augmenting image capture data with software installation and configuration information for a base station.
Figure 5B:
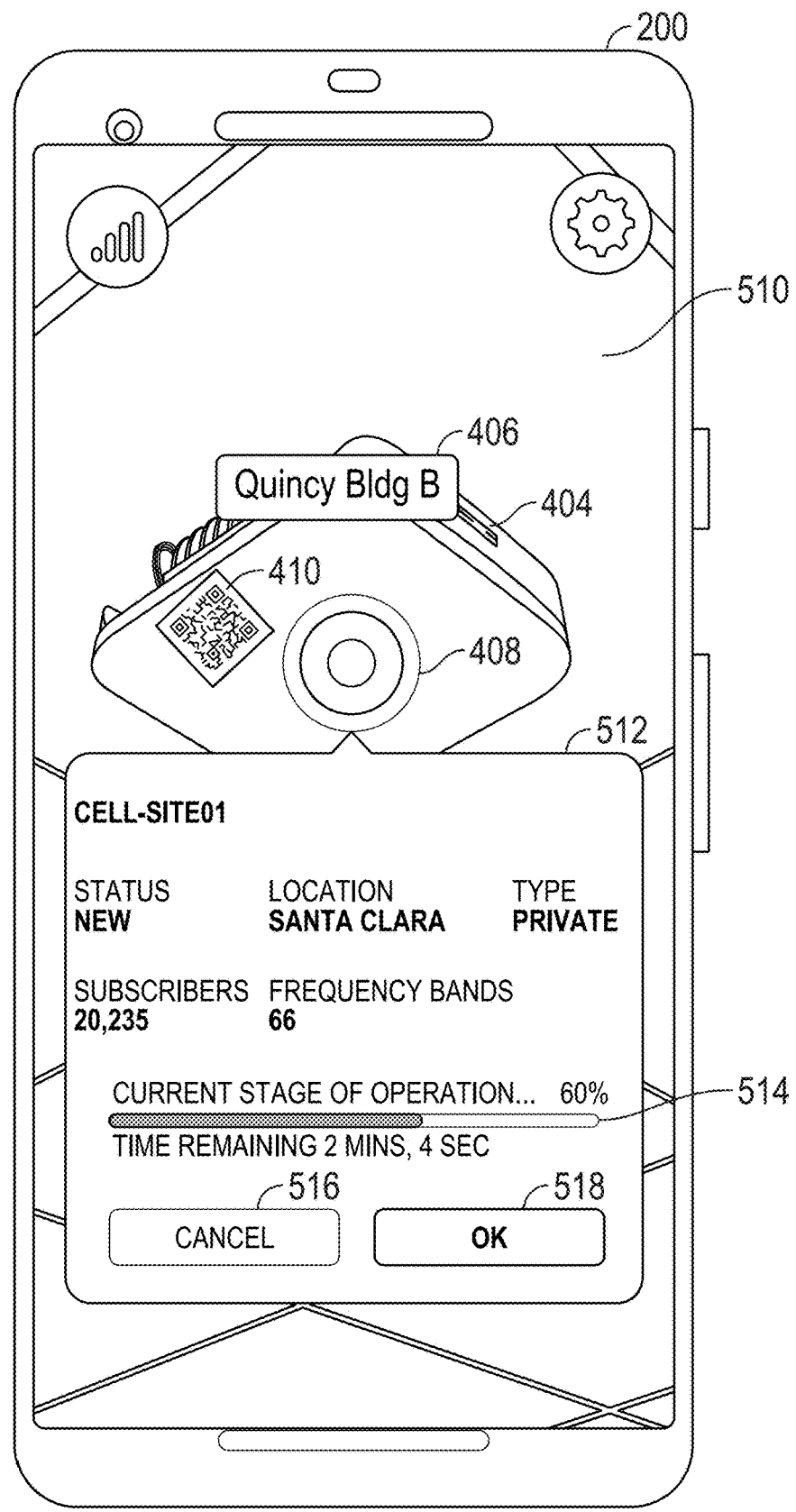

FIGS. 5A and 5B are conceptual views of user interface screens showing augmenting image capture data with software installation and configuration information for a base station. The examples illustrated in FIGS. 5A and 5B will be discussed in the context of the example installation of new base station 404 of FIG. 4.

FIG. 5A is a conceptual view of a user interface screen 502 showing a configuration of base station 404 prior to installing software on the selected base station. In the example illustrated in FIG. 5A, a user has used client device 200 to select base station 404 as described above with respect to FIG. 3. In some aspects, in response to selection of base station 404, AR application 104 can generate overlay image data 504 that represents status information for the base station. For example, a user may select base station 404 by selecting virtual button 408 displayed on the image of base station 404. In response to the selection of virtual button 408, AR application 104 can generate overlay image data 504. AR application 104 can merge overlay image data 504 with image capture data 124 to generate augmented image capture data 128 where overlay image data 504 appears on top of image capture data 124. AR application 104 can present on electronic display 130 as user interface screen 502. In some aspects, user image data 504 can include the selected base station name (e.g., "Cell-site01"), and information about the location, type, frequency bands, and number of subscribers associated with the selected base station. In some aspects, AR application 104 can position overlay image data 504 on a portion of, or in proximity to, the portion of image data 124 that represents the selected base station (e.g., base station 404).

In some aspects, user interface screen 502 can include "install" user interface element 506 that can cause software to be installed on the selected base station. In the example illustrated in FIG. 5A, user interface element 506 is positioned within overlay image data 504.

FIG. 5B is a conceptual view of a user interface screen 510 showing a configuration of base station 404 during installation of software on the selected base station. User interface screen 510 may be presented on electronic display 130 of client device 200 upon selection of the "install" user interface element 506 of FIG. 5A. Upon such selection, AR application 104 can cause software to be downloaded and installed on the selected base station (e.g., base station 404). In the example shown in FIG. 5B, AR application 104 can generate overlay image data 512 that represents installation status information for the base station, and can merge overlay image data 512 with image capture data 124 to generate augmented image capture data 128 which AR application 104 can present on electronic display 130 as user interface screen 510. Like overlay image data 504 of FIG. 5A, overlay image data 512 can include the selected base station name, and information about the location, type, frequency bands, and number of subscribers associated with the selected base station. Additionally, overlay image data 512 can include an indicator 514 of installation progress. Indicator 514 can be updated as the installation of software and configuration of base station 404 progresses. Overlay image data 512 can be positioned in the augmented image capture data 128 to appear to partially cover the selected base station (e.g., base station 404) or positioned near the selected base station.

In some aspects, user interface screen 510 can include "cancel" user interface element 516 that, upon selection, can cause the software installation to be canceled. Additionally, user interface screen 510 can include "OK" user interface element 518 that, upon selection, can cause AR application 104 to remove overlay image data 512 from user interface 510, while allowing the software installation and configuration of base station 404 to continue. In the example illustrated in FIG. 5B, user interface elements 514, 516, and 518 are positioned within overlay image data 512.

FIGS. 6A-6D are conceptual views of user interface screens showing augmenting image capture data with operational data for a network. The examples illustrated in FIGS. 6A-6D will be discussed in the context of the example operations of new base station 404 of FIG. 3 after installation and configuration as discussed above with respect to FIGS. 4A and 4B.

Figure 6A:
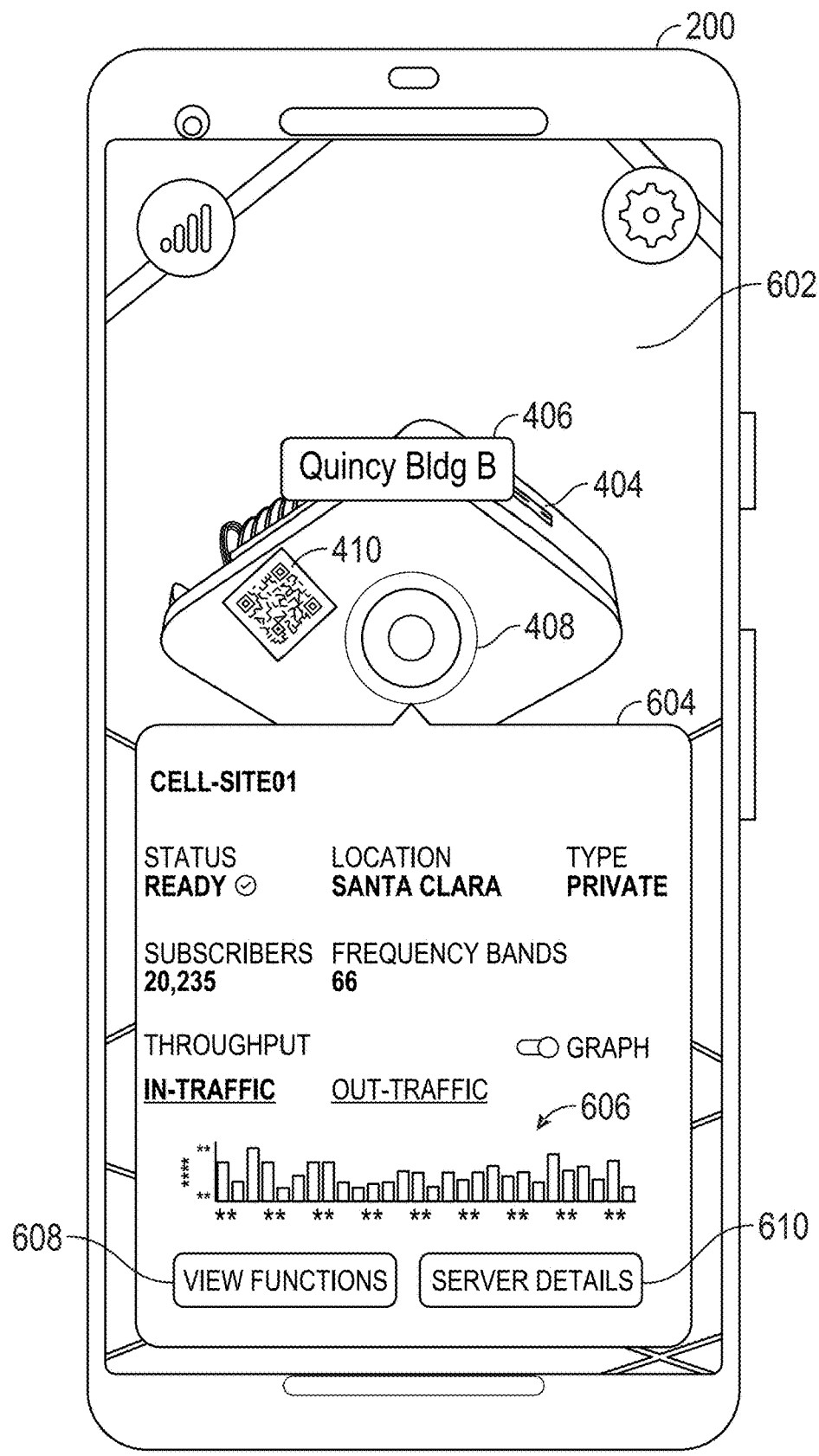
FIGS. 6A-6D are conceptual views of user interface screens showing augmenting image capture data with operational data for a network.

FIG. 6A is a conceptual view of a user interface screen 602 showing throughput data related to base station 404. In the example illustrated in FIG. 6A, a user has used client device 200 to select base station 404 as described above with respect to FIG. 3. In some aspects, in response to selection of base station 404, AR application 104 can generate overlay image data 604 that includes throughput information for the base station. For example, a user may select base station 404 by selecting virtual button 408 displayed on the image of base station 404. In response to the selection of virtual button 408, AR application 104 can generate overlay image data 604. AR application 104 can merge overlay image data 604 with image capture data 124 to generate augmented image capture data 128 such that overlay image data 604 appears over image capture data 124 in user interface screen 602. In some aspects, AR application 104 can position overlay image data 604 on a portion of, or in proximity to, the portion of image capture data 124 that represents the selected base station (e.g., base station 404). AR application 104 can present user interface 602 on electronic display 130 of client device 200.

In some aspects, overlay image data 604 can include the selected base station name (e.g., "Cell-site01"), and information about the location, type, frequency bands, and number of subscribers associated with the selected base station. Additionally, overlay image data 604 can include throughput statistics 606. In the example illustrated in FIG. 6A, throughput statistics 606 are represented as a graph of bars along a timeline. However, other formats may be used to present statistics 606 in overlay image data 604.

In the example illustrated in FIG. 6A, overlay image data 604 includes a "View Functions" interface element 608 and a "Server Details" interface element 610. Upon selection of the "View Functions" interface element 608, AR application 104 can present the user interface discussed below with respect to FIG. 6C. Upon selection of the "Server Details" interface element 610, AR application 104 can present the user interface discussed below with respect to FIG. 6B.

Figure 6B:
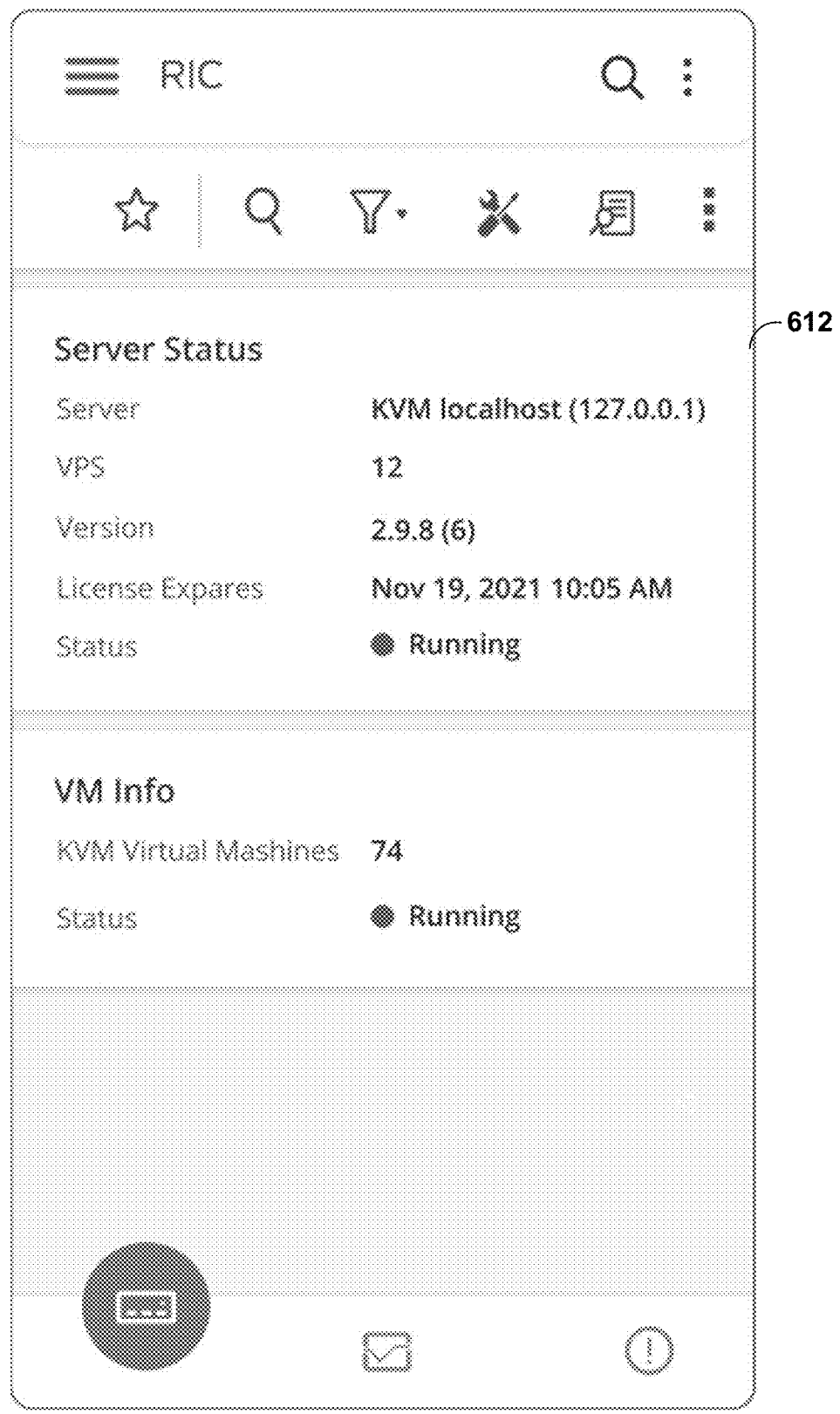

FIG. 6B is a conceptual view of a user interface screen 612 showing server details related to a network associated with base station 404. In some aspects, AR application 104 may present user interface screen 612 on electronic display 130 of client device 102, 200 in response to selection of "Server Details" interface element 610 of FIG. 6A. In the example shown in FIG. 6B, user interface screen 612 may include server status information such as the server IP address, server version, license information, current status of the server, number of virtual machines running on the server, and the status of the virtual machines.

Figure 6C:
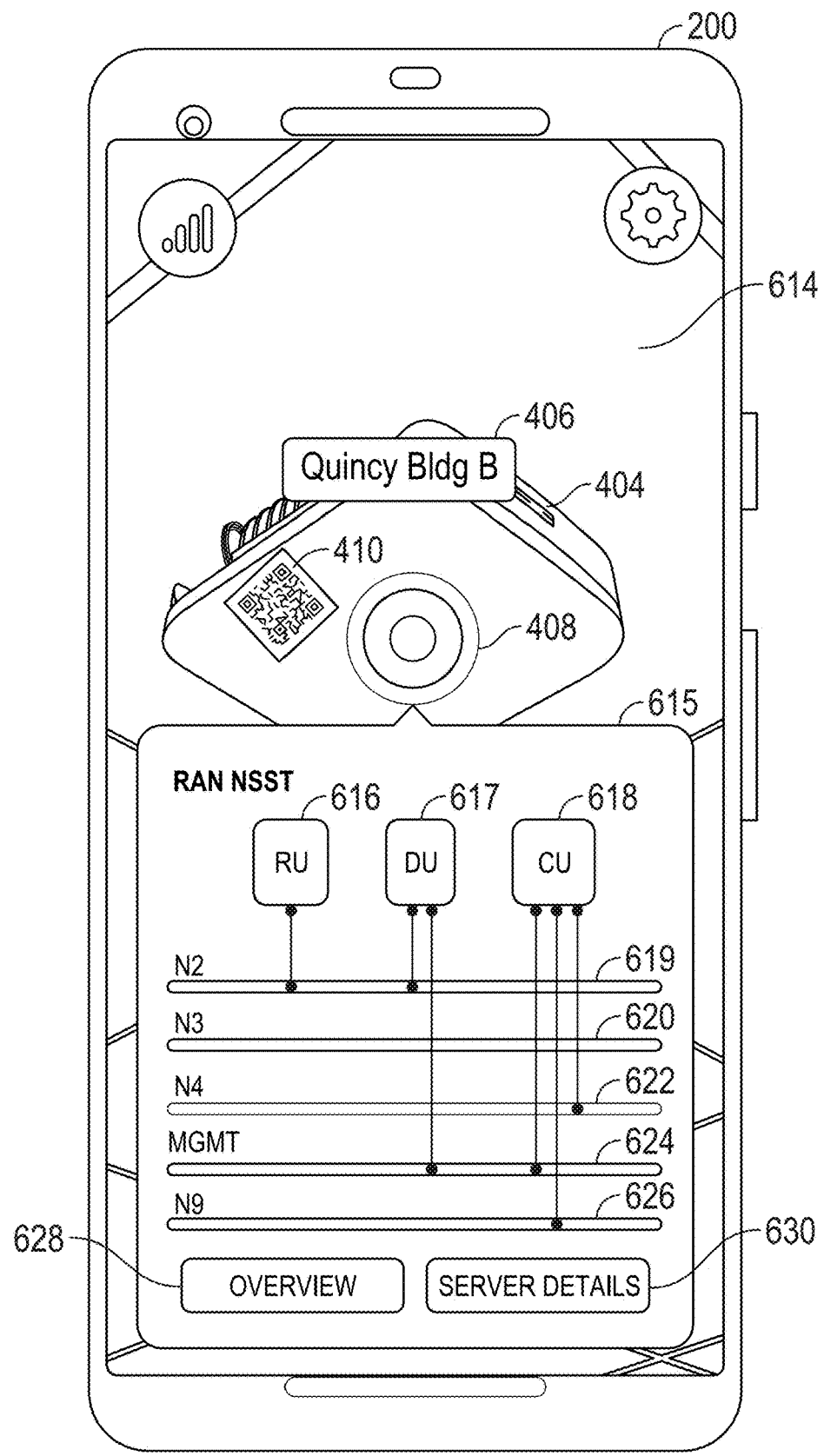

FIG. 6C is a conceptual view of a user interface screen showing functions for a RAN Network Slice Subnet Template (NSST) associated with a base station in the field of view of an image capture device of a client device. In some aspects, AR application 104 generates overlay image data 615 in response to selection of the "View Functions" interface element 608 of FIG. 6A. In the example shown in FIG. 6C, base station overlay image data 615 shows functions RU 616, DU 617, and CU 618 for the NSST along with the interfaces for each of the functions. For example, RU 616 is coupled to N2 interface 619. DU 617 is coupled to N2 interface 619 and management interface 624. CU 618 is coupled to management interface 624, N9 interface 626, and N4 interface 622.

AR application 104 can merge overlay image data 615 with image capture data 124 to generate augmented image capture data 128 such that overlay image data 615 appears over image capture data 124 in user interface screen 614. In some aspects, AR application 104 can position overlay image data 615 on a portion of, or in proximity to, the portion of image capture data 124 that represents the selected base station (e.g., base station 404). AR application 104 can present user interface screen 614 on electronic display 130 of client device 200.

In the example illustrated in FIG. 6C, overlay image data 615 includes an "Overview" interface element 628 and a "Server Details" interface element 630. Upon selection of the "Overview" interface element 628, AR application 104 can present the user interface discussed below with respect to FIG. 6D. Upon selection of the "Server Details" interface element 630, AR application 104 can present the user interface discussed above with respect to FIG. 6B.

Figure 6D:
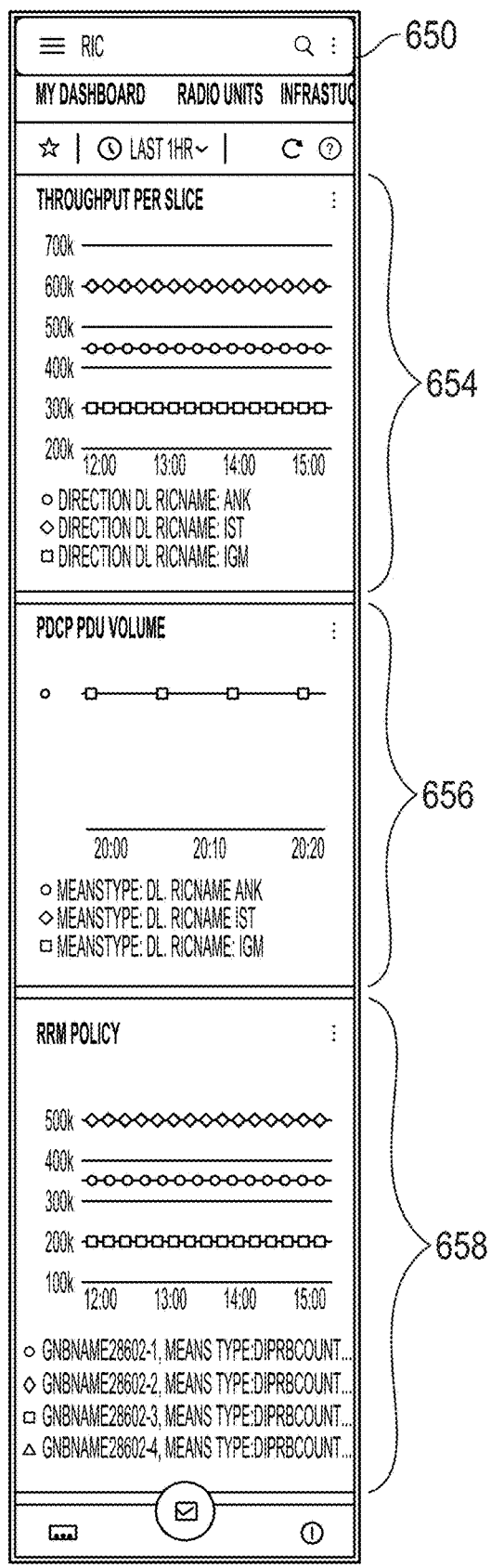

FIG. 6D is a conceptual view of a user interface screen 650 showing an overview of network slice performance related to a network associated with base station 404 selected from the field of view of an image capture device of a client device. In some aspects, AR application 104 may present user interface screen 650 on electronic display 130 of client device 102, 200 in response to selection of "Overview" interface element 628 of FIG. 6C. In the example shown in FIG. 6D, user interface screen 650 may include slice throughput section 654, Packet Data Convergence Protocol (PDCP) Protocol Data Unit (PDU) volume section 656, and Radio Resource Manager (RRM) policy portion 658. Slice throughput portion 654 can show slice throughput information through different portions of a network slice. In the example shown in FIG. 6C, the throughput information can include the throughput levels at different times, a direction (e.g., download or upload), and a RIC name.

PDCP PDU portion 656 can show PDU volume at a PDCP layer of the network that carries slice traffic. In the example shown in FIG. 6D, the PDU volume information can include the PDU throughput levels at different times, a direction (e.g., download or upload), and a RIC name.

RRM policy portion 658 can describe various aspects of a network slice. For instance, RRM policy portion 658 may display desired Service Level Agreement (SLA) or Service Level Expectation (SLE) with respect to a network slice or slices. In the example shown in FIG. 6D, RRM policy portion 658 displays network slice throughput information.

Figure 7:
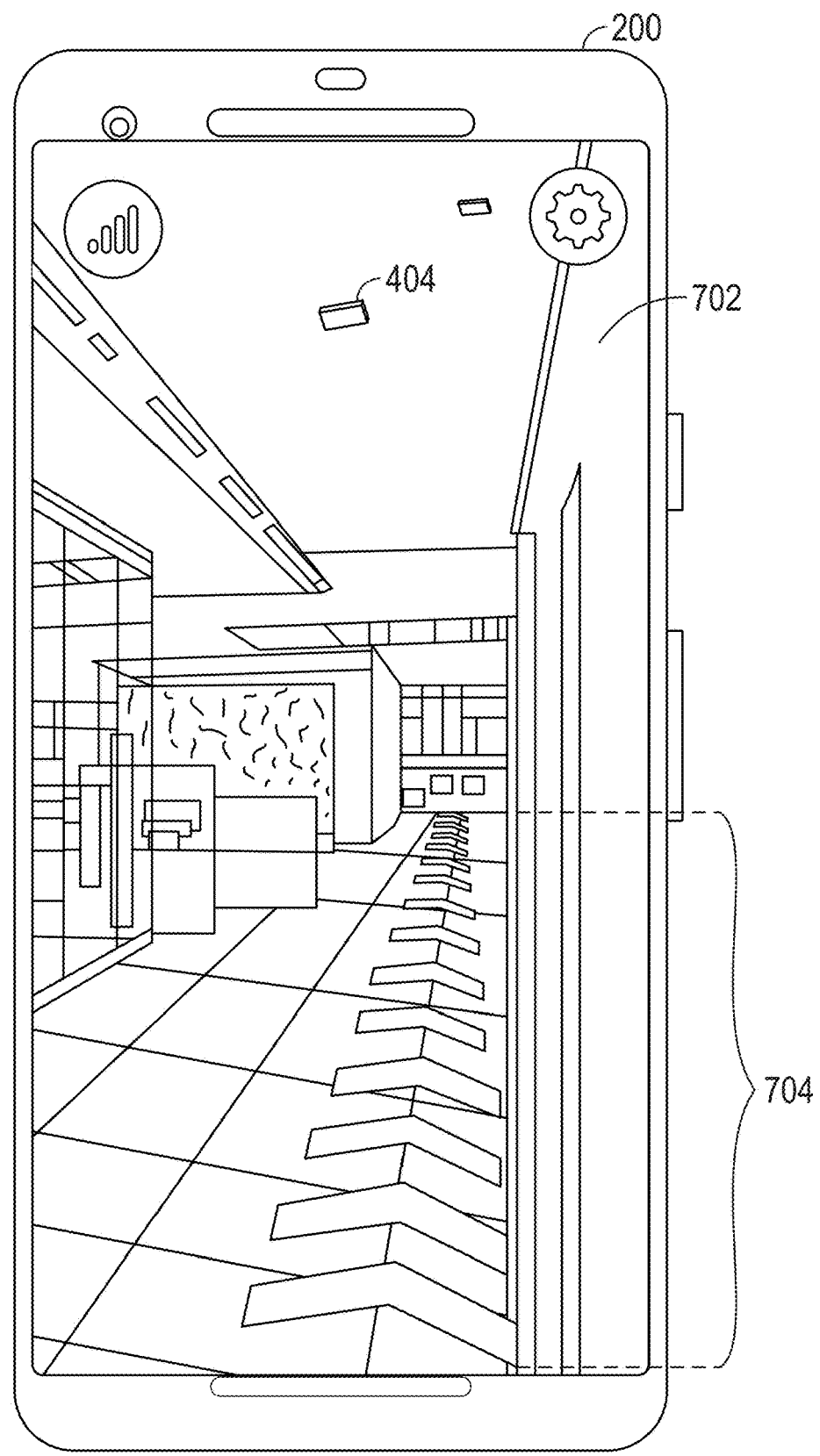
FIG. 7 is another conceptual view of a user interface screen showing augmenting image capture data with signal strength information, in accordance with one or more techniques of the disclosure.

FIG. 7 is another conceptual view of a user interface screen showing augmenting image capture data with signal strength information, in accordance with one or more techniques of the disclosure. In the example illustrated in FIG. 7, the signal strength has been obtained after installation of base station 404 is completed. AR application 104 (FIGS. 1A and 1B) executing on client device 200 can generate a user interface screen 702 that can be a frame of a video stream captured by an image capture device 122 of client device 200 and presented on electronic display 130 of client device 200. In this example, AR application 104 can generate image data for a line of glyphs 704 indicating signal strength along a line within the field of view of image capture device 122. As with the example shown in FIG. 2, AR application 104 can merge the image data for line of glyphs 702 with image capture data 124 for the frames of the video stream such that line of glyphs 206 to create augmented image capture data 128 where the line of glyphs 704 appear on top of image capture data 124. Each glyph in the line of glyphs corresponds to a signal strength at a location in the 3D environment captured by image capture device 122. AR application 104 positions the image data for line of glyphs 206 within augmented image capture data 124 such that each glyph in the line of glyphs corresponds to a signal strength measured in the 3D environment at a position in the image capture data 124 that corresponds to the location at which the signal strength was measured. In the example illustrated in FIG. 7, the line of glyphs 704 indicates a good signal strength over the entire area, indicating that the installation of base station 404 was effective in improving the signal strength compared to the example shown above in FIG. 2.

As will be appreciated from the above, AR application 104 can enable a tenant to troubleshoot a disaggregated 5G infrastructure. For example, a tenant can troubleshoot devices such as base stations, RUs, DUs, CUs, and 5G functions that may be provided by different vendors. For example, the tenant can use AR application 104 to check to determine if an RU is receiving or sending traffic. AR application 104 can provide information from the historical data maintained by RIC 120 or SMO 112 to determine when a problem started (e.g., time and day). In addition to the information presented in the example user interface screens of FIGS. 2-7, AR application 104 can provide other information in some implementations. For example, AR application 104 may provide information to suggest troubleshooting or corrective actions based on information obtained by AR application 104 from RIC 120 or SMO 112. AR application 104 can provide guidance on the electronic display of client device 101 to guide personnel to the network device that is experiencing an issue. In some aspects, AR application 104 can obtain predicted performance data for network devices in the field of view of the camera and compare current performance data with the predicted performance data. For example, AR application 104 can obtain predicted performance data from a network management and/or network analysis system that generates the predicted performance data. The network management and/or network analysis system can generate the predicted performance data using machine learning techniques, artificial intelligence techniques, or other techniques.

Figure 8:
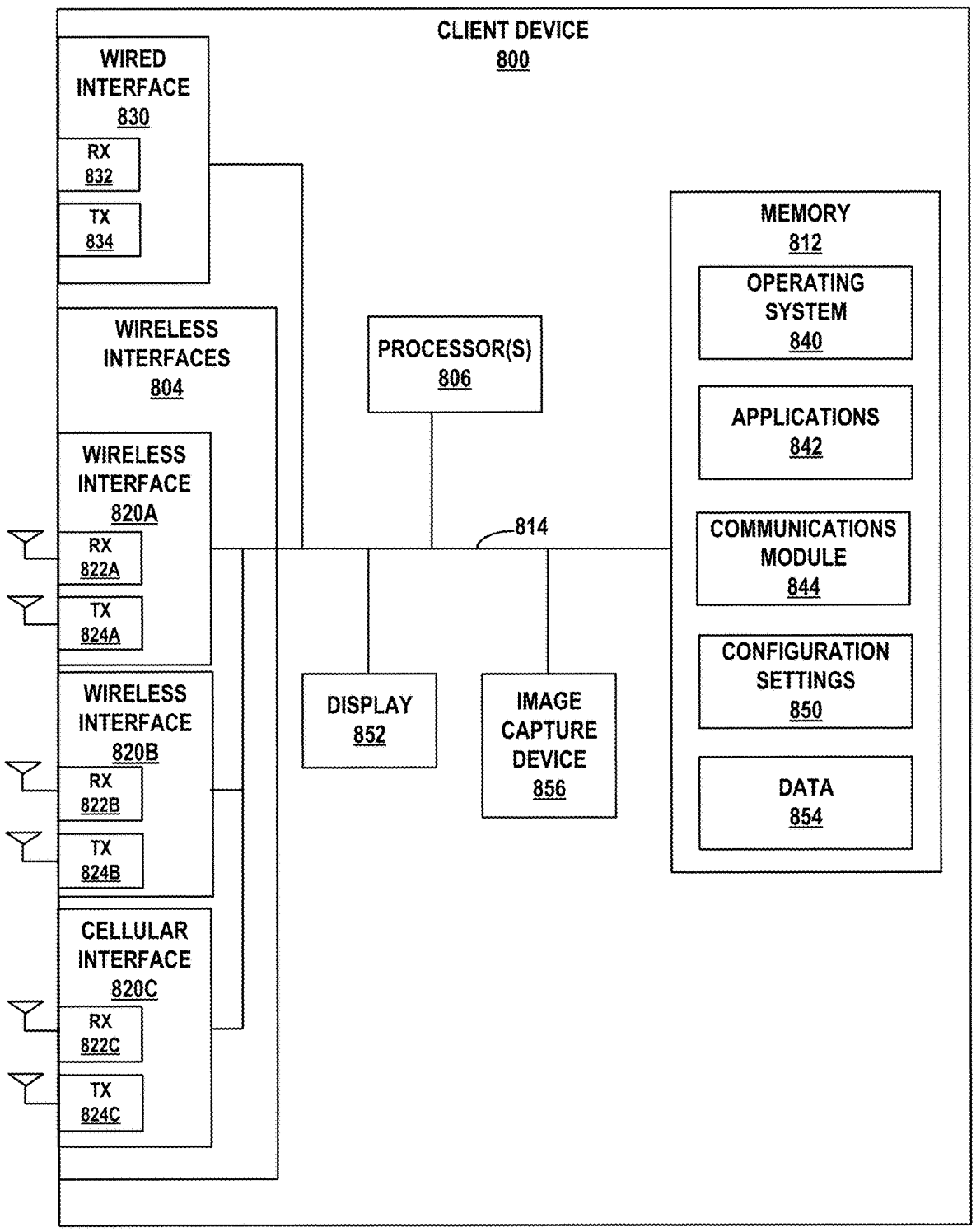
FIG. 8 shows an example client device 800, in accordance with one or more techniques of the disclosure.

FIG. 8 shows an example client device 800, in accordance with one or more techniques of the disclosure. Client device 800 shown in FIG. 8 may be used to implement any of client device 101 and/or UEs 148 as shown and described herein with respect to FIG. 1A, client device 200, or other client device described herein. Client device 800 may include any type of wireless client device, and the disclosure is not limited in this respect. For example, client device 800 may include a mobile device such as a smart phone, tablet or laptop computer, a personal digital assistant (PDA), a wireless terminal, a smart watch, a smart ring, or any other type of mobile or wearable device. In accordance with techniques described in this disclosure, client device 800 may also include a wired client-side device, e.g., an IoT device such as a printer, a security sensor or device, an environmental sensor, or any other device connected to the wired network and configured to communicate over one or more wireless networks.

Client device 800 includes a wired interface 830, wireless interfaces 820A-820C, one or more processor(s) 806, memory 812, and electronic display 852. The various elements are coupled together via a bus 814 over which the various elements may exchange data and information. Wired interface 830 represents a physical network interface and includes a receiver 832 and a transmitter 834. Wired interface 830 may be used, if desired, to couple, either directly or indirectly, client device 800 to a wired network device, such as one of switches 146 of FIG. 1A, within the wired network via a cable, such as one of Ethernet cables 144 of FIG. 1A.

First, second and third wireless interfaces 820A, 820B, and 820C include receivers 822A, 822B, and 822C, respectively, each including a receive antenna via which client device 800 may receive wireless signals from wireless communications devices, such as base stations 142 of FIG. 1A, base station 200 of FIG. 2, other UEs 148, or other devices configured for wireless communication. First, second, and third wireless interfaces 820A, 820B, and 820C further include transmitters 824A, 824B, and 824C, respectively, each including transmit antennas via which client device 800 may transmit wireless signals to wireless communications devices, such as base stations 142 of FIG. 1A, base station 200 of FIG. 2, other UEs 148 and/or other devices configured for wireless communication. In some examples, first wireless interface 820A may include a Wi-Fi 802.11 interface (e.g., 2.4 GHz and/or 5 GHz) and second wireless interface 820B may include a Bluetooth interface and/or a Bluetooth Low Energy interface. Third wireless interface 820C may include, for example, a cellular interface through which client device 800 may connect to a cellular network, such as a 5G mobile network whereby the client device 800 may connect to RUs of the 5G mobile network RAN.

Processor(s) 806 execute software instructions, such as those used to define a software or computer program, stored to a computer-readable storage medium (such as memory 812), such as non-transitory computer-readable mediums including a storage device (e.g., a disk drive, or an optical drive) or a memory (such as Flash memory or RAM) or any other type of volatile or non-volatile memory, that stores instructions to cause the one or more processors 806 to perform the techniques described herein.

Memory 812 includes one or more devices configured to store programming modules and/or data associated with operation of client device 800. For example, memory 812 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 806 to perform the techniques described herein.

In this example, memory 812 includes an operating system 840, applications 842, a communications module 844, configuration settings 850, and data storage 854. Applications 844 may include AR application 104. Communications module 844 includes program code that, when executed by processor(s) 806, enables client device 800 to communicate using any of wired interface(s) 830, wireless interfaces 820A-820B and/or cellular interface 850C. Configuration settings 850 include any device settings for client device 800 settings for each of wireless interface(s) 820A-820B and/or cellular interface 820C.

Data storage 854 may include, for example, image capture data from image capture device 856, signal strength heat maps and other signal strength location information, overlay images, configuration information etc.

Image capture device 856 may include a camera, infrared (IR) detector, Doppler radar, line scanner and the like, for capturing image data of the surrounding physical environment.

Electronic display 852 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output.

Figure 9:
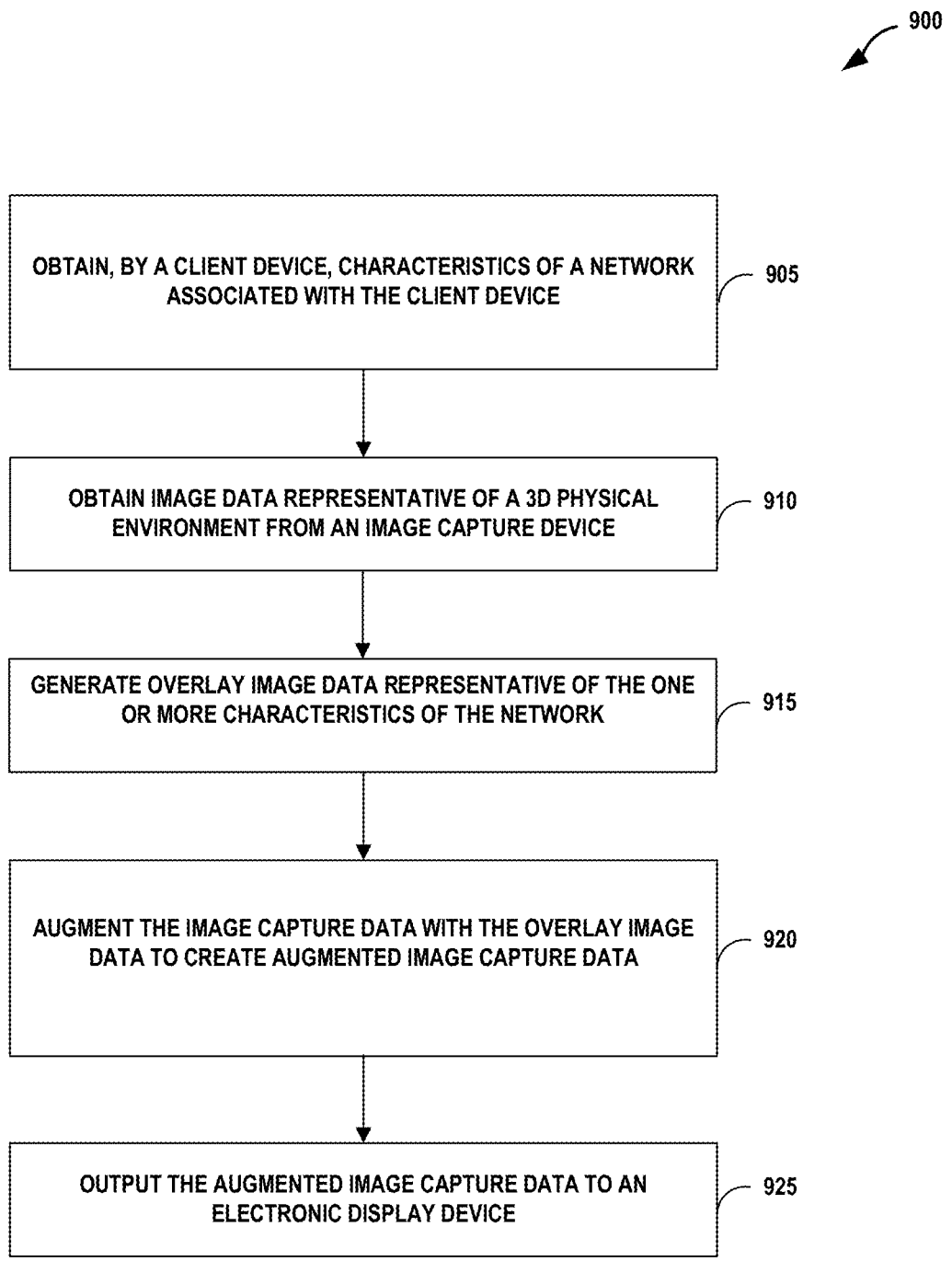
FIG. 9 is a flow diagram illustrating an example operation of an AR application, in accordance with one or more techniques of this disclosure.

FIG. 9 is a flow diagram illustrating an example operation of an AR application, in accordance with one or more techniques of this disclosure. An AR application of a client device may obtain characteristics of a network associated with the client device (905). Next, the AR application may obtain image data representative of a 3D physical environment from an image capture device (910). Next, the AR application may generate overlay image data representative of the one or more characteristics of the network (915). Next, the AR application may augment the image capture data with the overlay image data to create augmented image capture data (920). Next, the AR application may output the augmented image capture data to an electronic display device (925).

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A device comprising:
   one or more processors;
   an image capture device coupled to the one or more processors and configured to generate image capture data representative of a three-dimensional (3D) physical environment;

an electronic display coupled to the one or more processors; and a memory coupled to the one or more processors, the memory storing instructions to cause the one or more processors to:

obtain one or more characteristics of a network associated with the device, the one or more characteristics including a signal strength of a network signal in a portion of the 3D physical environment located in a direction of a portion of a field of view of the image capture device, generate overlay image data indicative of the one or more characteristics of the network, augment the image capture data with the overlay image data to create augmented image capture data, and output, to the electronic display, the augmented image capture data.

2. The device of claim 1, wherein the one or more characteristics of the network comprise one or more network performance characteristics associated with a network slice of the network.

3. The device of claim 1, wherein the instructions cause the one or more processors to:

identify, from the image capture data, a network device in the 3D physical environment, wherein the instructions to cause the one or more processors to obtain one or more characteristics of the network comprise instructions to cause the one or more processors to obtain one or more characteristics of the network device.

4. The device of claim 3, wherein the instructions to cause the one or more processors to identify the network device comprise instructions to scan the image capture data for indicia located on the network device.

5. The device of claim 3, wherein the one or more characteristics of the network comprise one or more network performance characteristics associated with the network device.

6. The device of claim 1, wherein the instructions to cause the one or more processors to obtain the one or more characteristics comprise instructions to cause the one or more processors to obtain the one or more characteristics from a database of characteristics including information stored by one of a Radio Access Network (RAN) intelligent controller (RIC) for the network or a Service and Management Orchestrator (SMO) for the network.

7. A device comprising:
one or more processors;
an image capture device coupled to the one or more processors and configured to generate image capture data representative of a three-dimensional (3D) physical environment;
an electronic display coupled to the one or more processors; and
a memory coupled to the one or more processors, the memory storing instructions to cause the one or more processors to:

obtain one or more characteristics of a network associated with the device;

generate overlay image data indicative of the one or more characteristics of the network, the overlay image data comprising image data for a line of glyphs, wherein each glyph in the line of glyphs indicates a signal strength of a network signal;

augment the image capture data with the overlay image data to create augmented image capture data by overlaying the image capture data with the image data for the line of glyphs such that each glyph in the line of glyphs is positioned in the image capture data at a position corresponding to the signal strength of the network signal at a location in the 3D environment represented by the position in the image capture data; and output, to the electronic display, the augmented image capture data.

8. The device of claim 7, wherein the one or more characteristics of the network comprise one or more network performance characteristics associated with a network slice of the network.

9. The device of claim 7, wherein the instructions cause the one or more processors to:

identify, from the image capture data, a network device in the 3D physical environment, wherein the instructions to cause the one or more processors to obtain one or more characteristics of the network comprise instructions to cause the one or more processors to obtain one or more characteristics of the network device.

10. The device of claim 9, wherein the instructions to cause the one or more processors to identify the network device comprise instructions to scan the image capture data for indicia located on the network device.

11. The device of claim 7, wherein the instructions to cause the one or more processors to obtain the one or more characteristics comprise instructions to cause the one or more processors to obtain the one or more characteristics from a database of characteristics including information stored by one of a Radio Access Network (RAN) intelligent controller (RIC) for the network or a Service and Management Orchestrator (SMO) for the network.

12. A method comprising:
obtaining, by one or more processors of a device, image capture data representative of a three-dimensional (3D) physical environment from an image capture device;
obtaining, by the one or more processors, one or more characteristics of a network associated with the device, the one or more characteristics including a signal strength of a network signal in a portion of the 3D physical environment located in a direction of a portion of a field of view of the image capture device;
generating, by the one or more processors, overlay image data indicative of the one or more characteristics of the network;
augmenting, by the one or more processors, the image capture data with the overlay image data to create augmented image capture data; and
outputting, by the one or more processors, the augmented image capture data to an electronic display device.

13. The method of claim 12, wherein the one or more characteristics of the network comprise one or more network performance characteristics associated with a network slice of the network.

14. The method of claim 12, further comprising:
identifying, from the image capture data, a network device in the 3D physical environment;
wherein obtaining the one or more characteristics of the network comprises obtaining one or more characteristics of the network device.

15. The method of claim 14, wherein identifying the network device comprises scanning the image capture data for indicia located on the network device.

16. The method of claim 14, wherein the one or more characteristics of the network comprise one or more network performance characteristics associated with the network device.

17. The method of claim 12, wherein obtaining the one or more characteristics comprises obtaining the one or more characteristics from a database of characteristics including information stored by one of a Radio Access Network (RAN) intelligent controller (RIC) communicatively coupled to the network or a Service and Management Orchestrator (SMO) for the network.

18. A method comprising:
obtaining, by one or more processors of a device, image capture data representative of a three-dimensional (3D) physical environment from an image capture device;
obtaining, by the one or more processors, one or more characteristics of a network associated with the device;
generating, by the one or more processors, overlay image data indicative of the one or more characteristics of the network, the overlay image data comprising image data for a line of glyphs, wherein each glyph in the line of glyphs indicates a signal strength of a network signal; and
augmenting, by the one or more processors, the image capture data with the overlay image data to create augmented image capture data by overlaying the image capture data with the overlay image data for the line of glyphs such that each glyph in the line of glyphs is positioned in the image capture data at a position corresponding to the signal strength of the network signal at a location in the 3D environment represented by the position in the image capture data; and
outputting, by the one or more processors, the augmented image capture data to an electronic display device.

19. Non-transitory, computer-readable media comprising instructions that, when executed, are configured to cause processing circuitry to:
obtain image capture data representative of a three-dimensional (3D) physical environment from an image capture device;
obtain one or more characteristics of a network associated with a device, the one or more characteristics including a signal strength of a network signal in a portion of the 3D physical environment located in a direction of a portion of a field of view of the image capture device;
generate overlay image data indicative of the one or more characteristics of the network;
augment the image capture data with the overlay image data to create augmented image capture data; and
output the augmented image capture data to an electronic display device.

20. Non-transitory, computer-readable media comprising instructions that, when executed, are configured to cause processing circuitry to:
obtain image capture data representative of a three-dimensional (3D) physical environment from an image capture device;
obtain one or more characteristics of a network associated with the device;
generate overlay image data indicative of the one or more characteristics of the network, the overlay image data comprising image data for a line of glyphs, wherein each glyph in the line of glyphs indicates a signal strength of a network signal;
augment the image capture data with the overlay image data to create augmented image capture data by overlaying the image capture data with the overlay image data for the line of glyphs such that each glyph in the line of glyphs is positioned in the image capture data at a position corresponding to the signal strength of the network signal at a location in the 3D environment represented by the position in the image capture data; and
output the augmented image capture data to an electronic display device.

\* \* \* \* \*